United States Patent [19]

Kurobe

[11] Patent Number: 5,592,225
[45] Date of Patent: Jan. 7, 1997

[54] DEVICE AND METHOD FOR CONTROLLING CODING

[75] Inventor: Akio Kurobe, Osaka, Japan

[73] Assignee: Matsushita Electric Industrial Co., Ltd., Osaka, Japan

[21] Appl. No.: 314,334

[22] Filed: Sep. 28, 1994

[30] Foreign Application Priority Data

Sep. 30, 1993 [JP] Japan ................................. 5-244564
May 18, 1994 [JP] Japan ................................. 6-104007

[51] Int. Cl.$^6$ ................................................. H04N 7/32
[52] U.S. Cl. ......................................... 348/405; 348/419
[58] Field of Search ................................. 348/400, 405, 348/419, 15, 17, 18, 19

[56] References Cited

U.S. PATENT DOCUMENTS

| | | |
|---|---|---|
| 4,622,682 | 11/1986 | Kumakura . |
| 4,984,076 | 1/1991 | Watanabe et al. ................ 348/405 |
| 5,027,356 | 6/1991 | Nakamura et al. . |
| 5,031,179 | 7/1991 | Yoshida et al. . |
| 5,452,103 | 9/1995 | Brusewitz ......................... 348/419 |

FOREIGN PATENT DOCUMENTS

| | | |
|---|---|---|
| 116650 | 8/1984 | European Pat. Off. . |
| 293189 | 11/1988 | European Pat. Off. . |
| 402954 | 6/1990 | European Pat. Off. . |
| 427108 | 5/1991 | European Pat. Off. . |
| 476603 | 3/1992 | European Pat. Off. . |
| 62-195987 | 8/1987 | Japan . |
| 62-206981 | 9/1987 | Japan . |
| 1200886 | 8/1989 | Japan . |
| 5122684 | 5/1993 | Japan . |
| 5206959 | 8/1993 | Japan . |
| 5227520 | 9/1993 | Japan . |
| 2252883 | 8/1992 | United Kingdom . |
| 2252471 | 8/1992 | United Kingdom . |

OTHER PUBLICATIONS

"VLSI Implementation of a Buffer, Universal Quantizer and Frame Rate Control Processor", by H. Uwabu et al. 928/ SPIE vol. 1605, Nov. 11, 1991.

"A Coding Control Algorithm for Motion Picture Coding Accomplishing Optimal Assignment of Coding Distortion to Time and Space Domains", by Y. Kato et al., Electronics and Communications in Japan Japan, Part 1, vol. 72, No. 9, 1989.

"A Coding Control Algorithm for Motion Picture Coding Accomplishing Optimal Assignment of Coding Distortion to Time and Space Domains", by Yoichi Kato et al., Aug. 1988.

*Primary Examiner*—Amelia Au
*Attorney, Agent, or Firm*—Price, Gess & Ubell

[57] ABSTRACT

A coding rate upper limit value storing unit and a coding rate lower limit value storing unit store a pair of a preset quantization accuracy and an upper limit value and a lower limit value on a coding rate corresponding to the preset quantization accuracy respectively. A coding rate calculating unit calculates a coding rate based on a code amount generated for a frame which was coded the last time. A first comparator and a second comparator compare a coding rate calculated by the coding rate calculating unit with an upper limit value and a lower limit value on a coding rate corresponding to a quantization accuracy with which a frame was coded the last time respectively. If the coding rate from the coding rate calculating unit is greater than the upper limit value or is smaller than the lower limit value, a quantization accuracy which is more accurate or less accurate than the quantization accuracy with which a frame was coded the last time is selected from quantization accuracies respectively. If a quantization accuracy is in a range between the lower limit value and the upper limit value, the range including the lower limit value and the upper limit value, the quantization accuracy with which a frame was coded the last time is selected. A quantization accuracy directing unit outputs the thus selected quantization accuracy to a quantizing unit, and the quantizing unit performs coding with the received quantization accuracy.

16 Claims, 21 Drawing Sheets

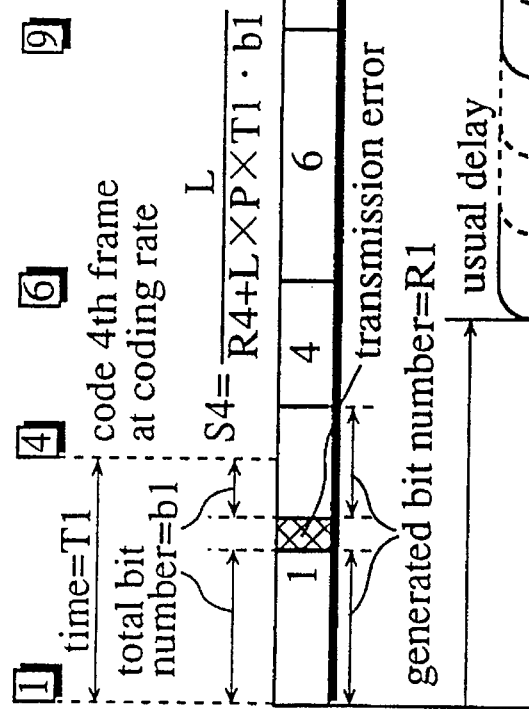
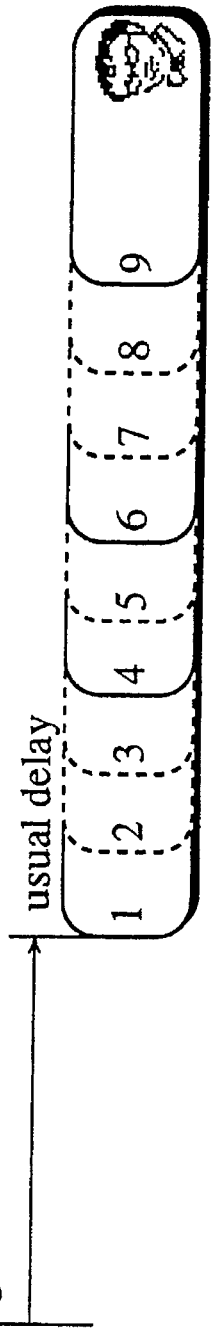
FIG. 15 (a) input picture frame
FIG. 15 (b) coding
FIG. 15 (c) radio transmission
FIG. 15 (d) display picture
$$S4 = \frac{L}{R4 + L \times P \times T1 \cdot b1}$$

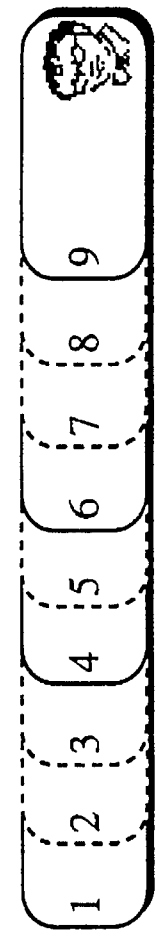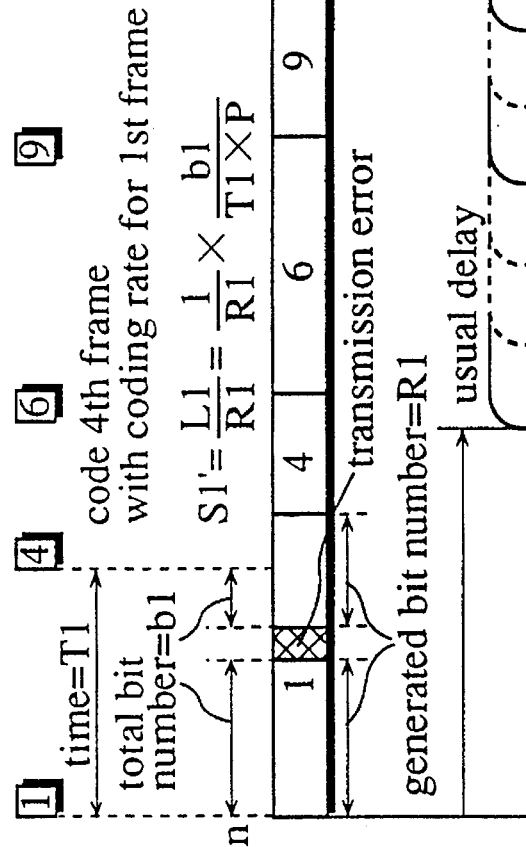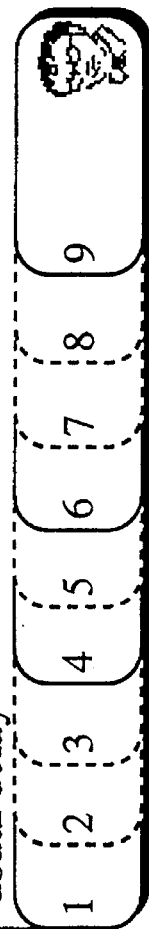
FIG. 20 (a) input picture frame
FIG. 20 (b) coding
FIG. 20 (c) radio transmission
FIG. 20 (d) display picture
code 4th frame with coding rate for 1st frame
$$S1' = \frac{L1}{R1} = \frac{1}{R1} \times \frac{b1}{T1 \times P}$$
transmission error
generated bit number=R1
usual delay
time=T1
total bit number=b1

DEVICE AND METHOD FOR CONTROLLING CODING

BACKGROUND OF THE INVENTION (1) Field of the Invention

The present invention relates to a device and a method for controlling coding of a picture for a teleconference, a visual telephone, and the like.

(2) Description of the Related Art

Conventionally, CCITT (Comite Consultatif International Telegraph et Telephone) advice H.261 is employed as an image coding (compressing) method for communicating moving pictures at a low rate of 64 Kbps. FIG. 1 is a block diagram depicting the configuration of a coding device which implements the coding method H.261. The coding device in FIG. 1 comprises a preparatory processing unit 1, a coding unit 2, a smoothing buffer 3, and a transmission controller 5.

The preparatory processing unit 1 comprises an A/D converter 11, an NTSC/CIF converter 12, and a preparatory processing filter 13. The A/D converter 11 separates Y and C signals from NTSC signal, and A/D converts the Y and C signals. The NTSC/CIF converter 12 converts the NTSC signal into CIF (Common Intermediate Format) which represents an intermediate format. The preparatory processing filter 13 eliminates noise. The intermediate format CIF is a common format which overcomes a regional difference in television system so that every cordic can communicate with each other. The coding unit 2 comprises a coding sub unit 22, a coding controller 210 for controlling the coding sub unit 22. The coding sub unit 22 comprises a movement compensation frame predicting unit 221, a DCT (Discrete Cosine Transform) 222, a quantizing unit 223, a first variable length coding sub unit 224, a second variable-length coding sub unit 225, and a multiplexer 226.

The movement compensation frame predicting unit 221 compensates movement in a range of 16×16 pixels, and calculates a prediction error between a frame which was coded the last time and a frame to be coded next. The DCT 222 DCT converts the prediction error signal so that spatial coordinate data is converted into frequency coordinate data. Note that a block unit of the prediction error signal to be converted by the DCT 222 includes 8×8 pixels. The quantizing unit 223 quantizes a conversion coefficient from the DCT 222. The first variable length coding sub unit 224 codes the quantized conversion coefficient into Huffman code. The second variable length coding sub unit 225 converts a movement vector which was employed in movement compensation into Huffman code. The multiplexer 226 multiplexes main information which is the coded result from the first variable length coding sub unit 224 and sub information which is the coded result from the second variable length coding sub unit 225 to generate a transmission frame. If a sufficient amount of memory capacity remains within the smoothing buffer 3, the multiplexer 226 outputs the transmission frame into the smoothing buffer 3. The smoothing buffer 3 is a FIFO (First In First Out) memory, and the transmission frames which have been inputted to the smoothing buffer 3 are outputted to a transmission path 4 in input order. The transmission controller 5 communicates with the reception side, and performs an Automatic-Repeat-Request (ARQ) to re-transmit information to the reception side in responsive to state of confirmation signal.

The thus constructed coding device needs to transmit picture signal relating to moving pictures which in itself takes an enormous amount of information at a limited transmission speed which is several 10 Kbps. For this reason, picture signal of every inputted frame cannot be transmitted directly; instead, picture signal has to be compressed to be around several 10 Kbps. In compressing, the amount of code data is reduced by thinning out some information; therefore, some coding distortions in a display picture relating to space and time domains are unavoidable at the reception side.

The amount of information relating to moving picture signal changes along with time even though it must be transmitted by a transmission path with a preset transmission speed. Therefore, moving pictures must be coded according to a transmission speed of a transmission path.

To obtain a visually sufficient display picture at the reception side, besides that a high coding efficiency is required, coding distortions must be assigned to time and space domains appropriately according to visual characteristics so that either of these two distortions is not significant to the human eyes.

Since spatial distortion and time distortion in a display picture are related to each other, a coding control method for controlling a coding parameter which relates these two distortions to each other has been proposed. More specifically, a coding control method for maintaining an optimal balance of movement reproductivity, spatial resolution, and noise within the amount of information which is limited by a transmission speed by controlling the coding parameter is desirable.

Spatial resolution, such as clarity or fineness of a display picture is determined by a quantization accuracy from the quantizing unit 223. When an input picture is coded with a higher quantization accuracy, a larger code amount R(t) is obtained. "t" in R (t) indicates a time which progresses by one frame period. It is assumed that a k-th picture frame, in which k is a natural number, is inputted at time t. One frame period starts when a picture frame is inputted and continues until the next picture frame is inputted. The code amount R(t) is generated when the k-th picture frame is inputted, and coded information is stored in the smoothing buffer 3. L bit codes are outputted from the smoothing buffer 3 to the transmission path 4 per one frame period. Therefore, when a B(t) code amount remains in the smoothing buffer 3 at the time t, $B(t+1)=B(t)+R(t)-L$ if the k-th picture frame is coded one frame period later than the time t. On the other hand, $B(t+1)=B(t)-L$ if the k-th frame is dropped. Note that a (k+1)th frame is coded if $B(t) \leq L$; a (k+1)th frame is dropped if $B(t) > L$. Also, $\{R(t)/L\}$ times one frame period is required to transmit an R(t) code amount of coded information, so that a coding rate S(t) is $S(t)=L/R(t)$ when the k-th picture frame is inputted (hereunder simply referred to a coding rate).

Picture quality of a decoded picture varies depending on a quantization accuracy which was employed to code an input picture. If picture quality of a decoded picture is evaluated by an S/N ratio, the S/N ratio improves when a quantization accuracy is raised; however, a coding rate is decreased thereby. Accordingly, picture frames are dropped at a higher rate, and movement reproductivity is lowered. To improve movement reproductivity with an improved coding rate, a quantization accuracy must be reduced to lower an S/N ratio. However, spatial resolution of a display picture is deteriorated. A picture quality tradeoff function $Ss=G(Ds)$ represents these mutual relations.

FIG. 2 shows an example of picture quality tradeoff function Ss. In FIG. 2, the horizontal axis and the vertical axis represent an S/N ratio and a coding rate respectively. A curve 101 represents a picture quality tradeoff function Ss. The picture quality tradeoff function Ss moves in the lower right hand direction when an input frame includes a big movement or a fine pattern, and it moves in the upper left hand direction with few movement. A point 103 represents a pair of a coding rate and a quantization accuracy which achieve an optimal balance of movement reproductivity and spatial resolution of a display picture visually. Such point 103 exists on a picture quality trade function for each input picture frame. A curve 102 in FIG. 2 obtained by linking the points 103 for input picture frames is an objection function So=O(Do).

To obtain a picture quality tradeoff function precisely, a picture frame must be coded repeatedly as varying a quantization accuracy, and a coding rate must be measured as for each quantization accuracy. However, this processing is time consuming, and it is not practical because of a limited processing time. "A coding Control Algorithm for Motion Picture Coding Accomplishing Optimal Assignment of Coding Distortion to Time and Space Domains", Electronic Information Communication Institute Report B, Vol. J71-B, No. B, pp945–954, August 1988 proposes two methods for determining a picture quality tradeoff function as referring to a frame which is currently coded.

A first method is explained. A prediction error signal DTC coefficient and a movement vector are obtained when movement compensation frame prediction and DCT are applied to a current input frame. A code amount $R(q)$ and an S/N ratio $D(q)$ are obtained based on a DCT coefficient histogram and a movement vector code amount for one frame as a function of a quantization accuracy q. Accordingly, a picture quality tradeoff function Ss=G(Ds) where a coding rate $S(q)=L/R(q)$ is related with an S/N ratio $D(q)$ can be obtained accurately.

FIG. 3 shows an example of picture quality tradeoff function cited in the reference. As shown in FIG. 3, picture quality tradeoff functions Ss are represented by different curve lines according to different input frames.

A second method is explained. In the second method, several candidates for a coding rate $S(q)$ and an S/N ratio (q) are prepared, and the ones which match with the coded result of a frame which was coded the last time are selected. Then, a picture quality tradeoff function Ss for a frame to be coded next is estimated as referring to the selected result.

FIG. 4 explains the second method for estimating a coding rate Ss(q). Numerals 1–6 which are attached to curves in FIG. 4 represent coding rate-quantization accuracy characteristic candidate numbers; a point C represents a coding rate and a quantization accuracy for a last frame. Clearly, the point C is located most closely to the curve 3, so that a coding rate Ss(q) and an SN ratio Ds(q) represented by the curve 3 are estimated as those to be employed at a time k. Similarly, an SN ratio Ds(q) is estimated.

As another reference, it is attempted to transmit moving picture data which is coded at a high efficiency via a digital radio line such as a cordless telephone or a portable telephone. "CORDLESS VIDEO" First International Workshop on Mobile Multimedia Communications B. 3.1-1 Dec. 7–10, 1993 reports an experiment which is designed to transmit moving picture data coded by Digital European Cordless Telecommunications (DECT) which is a digital cordless telephone in Europe according to ITC advice H.261. According to this reference, a digital radio line frequently causes transmission errors which deteriorate moving picture data compressed with high efficiency. Therefore, transmission errors should be corrected. A transmission error rate may be as bad as around 1% with a digital cordless communication line, and burst errors which extend to as long as several 10 msec may be caused by slow phasing if a cordless transmission device for communicating via a digital cordless communication line is employed at a walking speed or slower. It is pointed out in the reference that burst errors cannot be overcome by a simple FEC (Forward Error Correction) which adds a check bit to transmission data so that the reception side can correct errors. Accordingly, the reference suggests a method for randomizing burst errors by combining the FEC and an interleave of a data sequence.

However, to randomize burst errors which extend to several 10 msec, bit sequence of several 100 msec data must be interleaved. In this case, a transmission delay of several 100 msec is unavoidable. Such transmission delay interferes a mutual communication in real time with a visual telephone or the like. Thus, the use of this method is severely limited. Accordingly, the reference concludes that the Automatic-Repeat-Request (ARQ) is most desirable. According to the ARQ, an error in transmission information is detected by the reception side; the detected result is transmitted to the transmission side as confirmation signal; then the transmission information is re-transmitted from the transmission side to the reception side according to state of the confirmation signal.

As for the first method for obtaining a picture quality tradeoff function set forth above, a DCT coefficient histogram for a current input frame is obtained, and a code amount which represents a block type corresponding to each quantization accuracy and a code amount which represents a quantization index of a DCT coefficient are calculated; therefore, enormous calculations are needed, which will be problematic in terms of efficiency, price, storage space, and demand of electric power. Because of the reason stated above, at least one frame period of processing delay occurs, and this is disadvantageous to a visual telephone and a video conference which require real time transmission. The second method for obtaining a picture quality tradeoff function can reduce processing amount; however, information about candidates for a picture quality tradeoff function must be stored. This is a severe drawback to a coding control method relating to coding of moving pictures.

When a generated code amount exceeds a remaining storage capacity of the smoothing buffer, an overflow occurs, so that coded information for a frame cannot be transmitted. As a result, picture quality of a decoded picture is degraded by large. To improve picture quality, frame droppings are repeated until a remaining code amount B(t) of the smoothing buffer becomes a code amount L which can be transmitted in one frame period or less. In actual coding, an error between frames cannot be predicted immediately after a scene changes, so that a compression rate does not improve, and an enormous code amount remains; however, an error between frames can be predicted from the next frame, so that a compression rate improves, and a code amount is reduced largely. With the conventional frame dropping method; however, a large code amount is generated for an initial frame, and frames are dropped until the amount of codes within the smoothing buffer is reduced. Accordingly, a relation between a picture frame coded the last time and a picture frame to be coded next is weakened, so that a compression rate does not improve any longer even if an error between frames is predicted. Consequently, an enormous code amount is generated. Under such circumstances, a coding rate remains ineffective.

With the ARQ between the transmission side and the reception side according to the second method, data which was already transmitted is transmitted again if a transmission error occurs; therefore, a transmission speed is reduced as re-transmissions are increased. That is, a transmission speed varies depending on transmission quality of a transmission path. According to a currently proposed coding control algorithm which accomplishes optimal assignment of coding distortion to time and space domains, a coding rate is calculated as assuming that an Lbit code amount is transmitted to the transmission path in one frame period; therefore, a change in a transmission speed does not influence the coding control algorithm. However, compared to the case in which a transmission speed is not decreased at all, the smoothing buffer will be reduced more slowly when a transmission speed is decreased, so that the smoothing buffer generates an overflow which always appears as coding distortion to time domain (frame dropping). If coding distortion in a display picture caused by a decreased transmission speed can be divided into lowering of movement reproductivity and lowering of spatial resolution appropriately, a coding control method which is suitable for transmission of moving pictures by a radio line can be obtained even when a transmission speed of the radio line varies depending on transmission quality of a transmission path.

SUMMARY OF THE INVENTION

It is a first object of the present invention to provide a device and a method which are capable of achieving an optimal assignment of deterioration of movement reproductivity and deterioration of spatial resolution including noise in a display picture which occur in coding moving picture inputted for a frame and in transmitting the coded picture signal as dropping frames with simple control.

A coding method which fulfills the first object may be a coding method for coding moving pictures to be transmitted by a transmission path of a preset transmission speed as setting a pair of a quantization accuracy and a coding rate appropriately, the quantization accuracy by which coding distortion to space domain is measured and the coding rate being a function of the quantization accuracy by which coding distortion to time domain due to frame dropping is measured so that an optimal balance of the coding distortion in a display picture to time and space domains to human eyes is achieved, such coding method comprising a first step of coding with a first quantization accuracy, a second step of comparing a first coding rate which is obtained by coding at the first step with an upper limit value and a lower limit value on an optimal coding rate which are determined according to the first quantization accuracy and the first coding rate beforehand, and a third step of setting as a quantization accuracy for next coding a second quantization accuracy which is more accurate than the first quantization accuracy if the first coding rate is greater than the upper limit value, a third quantization accuracy which is less accurate than the first quantization accuracy if the first coding rate is smaller than the upper limit value, and the first quantization accuracy if the first coding rate is in a range between the lower limit value and the upper limit value, the range including both the lower limit value and the upper limit value.

The second step may comprise a code amount detecting step of detecting a code amount which is generated when a frame is coded with the first quantization accuracy, and a coding rate calculating step of calculating a coding rate by dividing a standard transmission speed of the transmission path by the detected code amount.

A coding device which fulfills the first object may be a coding device for coding moving pictures to be transmitted by a transmission path of a preset transmission speed as setting a pair of a quantization accuracy and a coding rate appropriately, the quantization accuracy by which coding distortion to space domain is measured and the coding rate being a function of the quantization accuracy by which coding distortion to time domain due to frame dropping is measured so that an optimal balance of the coding distortion in a display picture to time and space domains in visual terms is achieved, such coding device comprising a coding unit for coding a moving picture signal according to input order, a quantization accuracy holding unit for holding a quantization accuracy with which a latest frame is coded, a coding rate calculating unit for calculating a coding rate for a frame which was coded, an optimal coding rate upper limit storing unit for storing a preset upper limit value on an optimal coding rate which corresponds to a preset quantization accuracy, an optimal coding rate lower limit storing unit for storing a preset lower limit value on an optimal coding rate which corresponds to a preset quantization accuracy, a first comparing unit for comparing a coding rate for the latest frame calculated by the coding rate calculating unit with the upper limit value an optimal coding rate which corresponds to the quantization accuracy held by the quantization accuracy holding unit, a second comparing unit for comparing a coding rate for the latest frame calculated by the coding rate calculating unit with the lower limit value on an optimal coding rate which corresponds to the quantization accuracy held by the quantization accuracy holding unit, a quantization accuracy storing unit for storing a plurality of quantization accuracies which are set beforehand, a quantization accuracy selecting unit for selecting a quantization accuracy which is more accurate than the quantization accuracy with which the latest frame is coded when the coding rate for the latest frame is greater than the upper limit value on an optimal coding rate, for selecting a quantization accuracy which is less accurate than the quantization accuracy with which the latest frame is coded when the coding rate for the latest frame is smaller than the lower limit value on an optimal coding rate from the plurality of coding accuracies stored in the quantization accuracy storing unit, and for selecting the quantization accuracy with which the latest frame is coded when the coding rate for the latest frame is in a range between the lower limit value and the upper limit value, the range including both the lower limit value and the upper limit value, and a coding control unit for controlling the coding unit to operate next coding with the quantization accuracy selected by the quantization accuracy selecting unit.

The coding device may further comprise a code amount detecting unit for detecting a code amount which is generated when the latest frame is coded, wherein the coding rate calculating unit calculates a coding rate based on an expression which is (coding rate)=(standard transmission speed of transmission path)/(code amount).

The coding device may further comprise a transmitting unit for transmitting the coded frame to reception side by the transmission path, and re-transmits transmission information which Generates a transmission error in responding to a request from the reception side according to an ARQ (Automatic-Repeat-Request), a frame dropping time calculating unit for calculating a frame dropping time which starts when the coding unit starts coding and ends when the coding unit starts another coding, an actual transmission code amount detecting unit for detecting an actual transmission code amount which could be transmitted without an error within the frame dropping time calculated by the frame dropping time calculating unit, and an actual transmission speed calculating unit for calculating an actual transmission speed based on the frame dropping time calculated by the frame dropping time calculating unit and the actual transmission code amount calculated by the actual transmission code amount calculating unit, wherein the coding rate calculating unit calculates a coding rate based on the actual transmission speed calculated by the actual transmission speed calculating unit and the code amount which is generated when the latest frame is coded.

The coding device may further comprise a buffer for storing the coded frames in order and outputting them according to a First-In-First-Out manner, a code amount predicting unit for predicting a code amount which will be generated when the coding unit codes one frame, a remaining storage capacity detecting unit for detecting a remaining storage capacity of the buffer, and a coding instructing unit for instructing standby of the coding unit if the code amount predicted by the code amount predicting unit is larger than the remaining storage capacity of the buffer detected by the remaining storage capacity detecting unit; otherwise, instructing coding of the coding unit.

The code amount predicting unit may comprise a frame difference calculating unit for calculating a frame difference between a frame to be coded and a reference frame which is determined according to the frame to be coded, the frame difference representing a simple difference in picture information of a block located at the same location, a DCT (Discrete Cosine Transform) unit for DCT converting the frame difference according to DCT, an invalid block calculating unit for setting a first level of quantization as a threshold value, and summing an invalid block where every DCT coefficient obtained by the DCT unit is smaller than the threshold value, a valid block calculating unit for calculating a total number of a valid block by subtracting the invalid block from all the blocks included in a frame to be coded, a proportional constant calculating unit for calculating a proportional constant between the code amount detected by the code amount detecting unit and the valid block number relating to the latest frame calculated by the valid block calculating unit, and a predicted code amount calculating unit for calculating a predicted code amount by multiplying the valid block number relating to the frame to be coded by the proportional constant calculated by the proportional constant calculating unit.

It is a second object of the present invention to provide a device and a method which are capable of achieving an optimal assignment of deterioration of movement reproductivity and deterioration of spatial resolution including noise in a display picture which occur in coding moving picture inputted for a frame and in transmitting the coded picture signal as dropping frames with simple control even when scenes change frequently or a scene includes a big movement.

A coding method which fulfills the second object may be a coding method for coding moving pictures to be transmitted by a transmission path of a preset transmission speed as setting a pair of a quantization accuracy and a coding rate appropriately, the quantization accuracy by which coding distortion to space domain is measured and the coding rate being a function of the quantization accuracy by which coding distortion to time domain due to frame dropping is measured so that an optimal balance of the coding distortion in a display picture to time and space domains to human eyes is achieved, such coding method comprising a first step of coding with a first quantization accuracy, a second step of comparing a first coding rate which is obtained by coding at the first step with an upper limit value and a lower limit value on an optimal coding rate which are determined according to the first quantization accuracy and the first coding rate beforehand, and a third step of setting as a quantization accuracy for next coding a second quantization accuracy which is more accurate than the first quantization accuracy if the first coding rate is greater than the upper limit value, a third quantization accuracy which is less accurate than the first quantization accuracy if the first coding rate is smaller than the upper limit value, and the first quantization accuracy if the first coding rate is in a range between the lower limit value and the upper limit value, the range including both the lower limit value and the upper limit value.

The second step may comprise a code amount detecting step of detecting a code amount which is generated when a frame is coded with the first quantization accuracy, and a coding rate calculating step of calculating a coding rate by dividing a standard transmission speed of the transmission path by the detected code amount.

A coding device which fulfills the second object may be a coding device for coding moving pictures to be transmitted by a transmission path of a preset transmission speed as setting a pair of a quantization accuracy and a coding rate appropriately, the quantization accuracy by which coding distortion to space domain is measured and the coding rate being a function of the quantization accuracy by which coding distortion to time domain due to frame dropping is measured so that an optimal balance of the coding distortion in a display picture to time and space domains in visual terms is achieved, such coding device comprising a coding unit for coding a moving picture signal according to input order, a quantization accuracy holding unit for holding a quantization accuracy with which a latest frame is coded, a coding rate calculating unit for calculating a coding rate for a frame which was coded, an optimal coding rate upper limit storing unit for storing a preset upper limit value on an optimal coding rate which corresponds to a preset quantization accuracy, an optimal coding rate lower limit storing unit for storing a preset lower limit value on an optimal coding rate which corresponds to a preset quantization accuracy, a first comparing unit for comparing a coding rate for the latest frame calculated by the coding rate calculating unit with the upper limit value an optimal coding rate which corresponds to the quantization accuracy held by the quantization accuracy holding unit, a second comparing unit for comparing a coding rate for the latest frame calculated by the coding rate calculating unit with the lower limit value on an optimal coding rate which corresponds to the quantization accuracy held by the quantization accuracy holding unit, a quantization accuracy storing unit for storing a plurality of quantization accuracies which are set beforehand, a quantization accuracy selecting unit for selecting a quantization accuracy which is more accurate than the quantization accuracy with which the latest frame is coded when the coding rate for the latest frame is Greater than the upper limit value on an optimal coding rate, for selecting a quantization accuracy which is less accurate than the quantization accuracy with which the latest frame is coded when the coding rate for the latest frame is smaller than the lower limit value on an optimal coding rate from the plurality of coding accuracies stored in the quantization accuracy storing unit, and for selecting the quantization accuracy with which the latest frame is coded when the coding rate for the latest frame is in a range between the lower limit value and the upper limit value, the range including both the lower limit value and the upper limit value, and a coding control unit for controlling the coding unit to operate next coding with the quantization accuracy selected by the quantization accuracy selecting unit.

The coding device may further comprise a code amount detecting unit for detecting a code amount which is generated when the latest frame is coded, wherein the coding rate calculating unit calculates a coding rate based on an expression which is (coding rate)=(standard transmission speed of transmission path)/(code amount).

The coding device may further comprise a transmitting unit for transmitting the coded frame to reception side by the transmission path, and re-transmits transmission information which generates a transmission error in responding to a request from the reception side according to an ARQ (Automatic-Repeat-Request), a frame dropping time calculating unit for calculating a frame dropping time which starts when the coding unit starts coding and ends when the coding unit starts another coding, an actual transmission code amount detecting unit for detecting an actual transmission code amount which could be transmitted without an error within the frame dropping time calculated by the frame dropping time calculating unit, and an actual transmission speed calculating unit for calculating an actual transmission speed based on the frame dropping time calculated by the frame dropping time calculating unit and the actual transmission code amount calculated by the actual transmission code amount calculating unit, wherein the coding rate calculating unit calculates a coding rate based on the actual transmission speed calculated by the actual transmission speed calculating unit and the code amount which is generated when the latest frame is coded.

The coding device may further comprise a buffer for storing the coded frames in order and outputting them according to a First-In-First-Out manner, a code amount predicting unit for predicting a code amount which will be generated when the coding unit codes one frame, a remaining storage capacity detecting unit for detecting a remaining storage capacity of the buffer, and a coding instructing unit for instructing standby of the coding unit if the code amount predicted by the code amount predicting unit is larger than the remaining storage capacity of the buffer detected by the remaining storage capacity detecting unit; otherwise, instructing coding of the coding unit.

The code amount predicting unit may comprise a frame difference calculating unit for calculating a frame difference between a frame to be coded and a reference frame which is determined according to the frame to be coded, the frame difference representing a simple difference in picture information of a block located at the same location, a DCT (Discrete Cosine Transform) unit for DCT converting the frame difference according to DCT, an invalid block calculating unit for setting a first level of quantization as a threshold value, and summing an invalid block where every DCT coefficient obtained by the DCT unit is smaller than the threshold value, a valid block calculating unit for calculating a total number of a valid block by subtracting the invalid block from all the blocks included in a frame to be coded, a proportional constant calculating unit for calculating a proportional constant between the code amount detected by the code amount detecting unit and the valid block number relating to the latest frame calculated by the valid block calculating unit, and a predicted code amount calculating unit for calculating a predicted code amount by multiplying the valid block number relating to the frame to be coded by the proportional constant calculated by the proportional constant calculating unit.

It is a third object of the present invention to provide a method and a device for controlling coding which can reduce frame droppings which occur immediately after scenes change.

A coding method which fulfills the third object may be a coding method for coding to compress a moving picture signal for a frame, and outputting the coded frame to a transmission path via a buffer, the coding method comprising a coding step of coding the inputted moving picture signal for a frame, a buffer outputting step of outputting the coded frame to a buffer, a transmission path outputting step of outputting code information within the buffer to the transmission path, an inputting step of inputting a next frame, a code amount predicting step of predicting a code amount which will be generated when the inputted frame is coded, a remaining storage capacity detecting step of detecting a remaining storage capacity of the buffer, a comparing step of comparing the detected remaining storage capacity of the buffer with the predicted code amount, and a coding control step of instructing coding when the remaining storage capacity of the buffer is the predicted code amount or greater, otherwise instructing staying in standby until the next frame is inputted.

The coding step may comprise a code amount detecting step of detecting a code amount which is generated when a frame is coded, and a proportional constant calculating step of calculating a proportional constant by dividing the detected code amount by a valid block number of the coded frame, and the code amount predicting step may comprise a frame difference value calculating step of calculating a simple difference between the inputted frame and a reference frame which is employed in prediction coding, a DCT (Discrete Cosine Transform) step of DCT converting the calculated difference, an invalid block calculating step of comparing a DCT coefficient obtained by the DCT with a threshold value which is a first level of quantization, and summing an invalid block where every DCT coefficient is smaller than the threshold value, a valid block calculating step of summing the valid block by subtracting the invalid block from all the blocks for the inputted frame, and a code amount predicting step of predicting a code amount by multiplying the valid block number by the proportional constant.

A coding device which fulfills the third object may be a coding device for coding to compress a moving picture signal for a frame, and outputting the coded frame to a transmission path via a buffer, the coding device comprising a coding unit for coding the inputted moving picture signal for a frame, a code amount predicting unit for predicting a code amount which will be generated when the coding unit codes one frame, a remaining storage capacity detecting unit for detecting a remaining storage capacity of the buffer, and a coding instructing unit for instructing standby of the coding unit if the code amount predicted by the code amount predicting unit is larger than the remaining storage capacity of the buffer detected by the remaining storage capacity detecting unit; otherwise, instructing coding of the coding unit.

The code amount predicting unit may comprise a frame difference calculating unit for calculating a frame difference between a frame to be coded and a reference frame which is determined according to the frame to be coded, the frame difference representing a simple difference in picture information of a block located at the same location, a DCT (Discrete Cosine Transform) unit for DCT converting the frame difference according to DCT, an invalid block calculating unit for setting a first level of quantization as a threshold value, and summing an invalid block where every DCT coefficient obtained by the DCT unit is smaller than the threshold value, a valid block calculating unit for calculating a total number of a valid block by subtracting the invalid block from all the blocks included in a frame to be coded, a proportional constant calculating unit for calculating a proportional constant between the code amount detected by the code amount detecting unit and the valid block number relating to the latest frame calculated by the valid block calculating unit, and a predicted code amount calculating unit for calculating a predicted code amount by multiplying the valid block number relating to the frame to be coded by the proportional constant calculated by the proportional constant calculating unit.

The code amount predicting unit may comprise a frame difference calculating unit for calculating a frame difference between a frame to be coded and a reference frame which is determined according to the frame to be coded, the frame difference representing a simple difference in picture information of a block located at the same location, a DCT (Discrete Cosine Transform) unit for DCT converting the frame difference according to DCT, an invalid block calculating unit for setting a first level of quantization as a threshold value, and summing an invalid block where every DCT coefficient obtained by the DCT unit is smaller than the threshold value, a valid block calculating unit for calculating a total number of a valid block by subtracting the invalid block from all the blocks included in a frame to be coded, a proportional constant calculating unit for calculating a proportional constant between the code amount detected by the code amount detecting unit and the valid block number relating to the latest frame calculated by the valid block calculating unit, and a predicted code amount calculating unit for calculating a predicted code amount by multiplying the valid block number relating to the frame to be coded by the proportional constant calculated by the proportional constant calculating unit.

The coding device may further comprise a buffer for storing the coded frames in order and outputting them according to a First-In-First-Out manner, a code amount predicting unit for predicting a code amount which will be generated when the coding unit codes one frame, a remaining storage capacity detecting unit for detecting a remaining storage capacity of the buffer, and a coding instructing unit for instructing standby of the coding unit if the code amount predicted by the code amount predicting unit is larger than the remaining storage capacity of the buffer detected by the remaining storage capacity detecting unit; otherwise, instructing coding of the coding unit.

The code amount predicting unit may comprise a frame difference calculating unit for calculating a frame difference between a frame to be coded and a reference frame which is determined according to the frame to be coded, the frame difference representing a simple difference in picture information of a block located at the same location, a DCT (Discrete Cosine Transform) unit for DCT converting the frame difference according to DCT, an invalid block calculating unit for setting a first level of quantization as a threshold value, and summing an invalid block where every DCT coefficient obtained by the DCT unit is smaller than the threshold value, a valid block calculating unit for calculating a total number of a valid block by subtracting the invalid block from all the blocks included in a frame to be coded, a proportional constant calculating unit for calculating a proportional constant between the code amount detected by the code amount detecting unit and the valid block number relating to the latest frame calculated by the valid block calculating unit, and a predicted code amount calculating unit for calculating a predicted code amount by multiplying the valid block number relating to the frame to be coded by the proportional constant calculated by the proportional constant calculating unit.

It is a fourth object of the present invention to provide a device and a method which are capable of achieving an optimal assignment of deterioration of movement reproductivity and deterioration of spatial resolution including noise in a display picture which are caused by reduction of a transmission speed of a transmission path due to a transmission error.

A coding method which fulfills the fourth object may be the above coding method wherein the second step comprises a code amount detecting step of detecting a code amount which is generated when a frame is coded with the first quantization accuracy, an average transmission speed calculating step of calculating an average transmission speed during a period which begins when coding with the first quantization accuracy starts and continues until a preset standby time is over, and a coding rate calculating step of calculating a coding rate by dividing the calculated average transmission speed by the detected code amount.

The second step may comprise a code amount detecting step of detecting a code amount which is generated when a frame is coded with the first quantization accuracy, an actual transmission code amount detecting step of detecting an actual transmission code amount which could be transmitted without an error during a period which begins when coding with the first quantization accuracy starts and continues until a preset standby time is over, a standard transmission code amount calculating step of calculating a standard transmission code amount which should have been transmitted within the standby period by multiplying the standard speed of the transmission path by the standby time, an untransmitted code amount calculating step of calculating an untransmitted code amount which could have been transmitted within the standby period if a transmission speed had not been decreased by subtracting the actual code amount which could be transmitted safely within the standby period from the code amount which were planned to be transmitted within the standby time, a corrected code amount calculating step of calculating a corrected code amount by adding the untransmitted code amount to the detected code amount, and a coding rate calculating step of calculating a coding rate by dividing the standard speed of the transmission path by the corrected code amount.

A coding device which fulfills the fourth object may be a coding device for setting a collection of optimal operation points each accomplishing an optimal assignment of coding distortion in a display picture to human eyes on two dimensional coordinates which comprises a coordinate axis representing an amount of time distortion and a coordinate axis representing an amount of spatial distortion, both the time distortion and the spatial distortion being determined according to a parameter being a quantization accuracy, and employing an operation point which is an intersected point of a characteristic curve on the two dimensional coordinates obtained by coding a single frame with various quantization accuracies and the collection of optimal operation points in order to code the same frame, such coding device comprising a coding unit for coding an inputted moving picture signal, a transmitting unit for transmitting the coded frame to reception side via a transmission path, and re-transmitting transmission information which Generates a transmission error according to an ARQ (Automatic-Repeat-Request) in responding to a request from the reception side, a frame dropping time calculating unit for calculating a frame dropping time which starts when the coding unit starts coding and ends when the coding unit starts next coding, an actual transmission code amount detecting unit for detecting an actual transmission code amount which could be transmitted safely by the transmitting unit within the frame dropping time calculated by the frame dropping time calculating unit, an untransmitted code amount calculating unit for calculating an untransmitted code amount which could have been transmitted within the frame dropping time if a transmission speed had not been decreased due to re-transmission based on the frame dropping time, the actual transmission code amount, and a standard transmission speed of the transmission path, an objective function storing unit for storing pairs each including an S/N ratio and a coding rate which represent each optimal operation point on the two dimensional coordinates, a code amount predicting unit for predicting a code amount which will be generated when coding is completed according to a code amount which is detected when a frame to be coded is DCT converted (Discrete Concise Transform), a coding rate calculating unit for calculating a coding rate based on an expression (coding rate)=(standard transmission speed of transmission path)/(actual code amount) in which the actual code amount is obtained by adding the untransmitted code amount which is calculated by the untransmitted code amount calculating unit within the frame dropping time which continues until coding of a frame to be coded next starts to the predicted code amount from the code amount predicting unit, an S/N ratio calculating unit for calculating an S/N ratio based on a DCT coefficient histogram immediately after the frame to be coded is DCT converted, a characteristic function calculating unit for calculating a characteristic function according to the coding rate calculated by the coding rate calculating unit and the S/N ratio calculated by the S/N ratio calculating unit, an optimal operation point calculating unit for calculating an optimal operation point which is an intersected point of the objective function stored in the objective function storing unit and the characteristic function calculated by the characteristic function calculating unit, a quantization accuracy calculating unit for calculating a quantization accuracy of the optimal operation point calculated by the optimal operation point calculating unit, and a coding control unit for instructing coding with the quantization accuracy of the optimal operation point calculated by the quantization accuracy calculating unit.

The coding device may further comprise a transmitting unit for transmitting the coded frame to reception side by the transmission path, and re-transmits transmission information which generates a transmission error in responding to a request from the reception side according to an ARQ (Automatic-Repeat-Request), a frame dropping time calculating unit for calculating a frame dropping time which starts when the coding unit starts coding and ends when the coding unit starts another coding, an actual transmission code amount detecting unit for detecting an actual transmission code amount which could be transmitted without an error within the frame dropping time calculated by the frame dropping time calculating unit, and an actual transmission speed calculating unit for calculating an actual transmission speed based on the frame dropping time calculated by the frame dropping time calculating unit and the actual transmission code amount calculated by the actual transmission code amount calculating unit, wherein the coding rate calculating unit calculates a coding rate based on the actual transmission speed calculated by the actual transmission speed calculating unit and the code amount which is generated when the latest frame is coded.

The coding device may further comprise a buffer for storing the coded frames in order and outputting them according to a First-In-First-Out manner, a code amount predicting unit for predicting a code amount which will be generated when the coding unit codes one frame, a remaining storage capacity detecting unit for detecting a remaining storage capacity of the buffer, and a coding instructing unit for instructing standby of the coding unit if the code amount predicted by the code amount predicting unit is larger than the remaining storage capacity of the buffer detected by the remaining storage capacity detecting unit; otherwise, instructing coding of the coding unit.

The code amount predicting unit may comprise a frame difference calculating unit for calculating a frame difference between a frame to be coded and a reference frame which is determined according to the frame to be coded, the frame difference representing a simple difference in picture information of a block located at the same location, a DCT (Discrete Cosine Transform) unit for DCT converting the frame difference according to DCT, an invalid block calculating unit for setting a first level of quantization as a threshold value, and summing an invalid block where every DCT coefficient obtained by the DCT unit is smaller than the threshold value, a valid block calculating unit for calculating a total number of a valid block by subtracting the invalid block from all the blocks included in a frame to be coded, a proportional constant calculating unit for calculating a proportional constant between the code amount detected by the code amount detecting unit and the valid block number relating to the latest frame calculated by the valid block calculating unit, and a predicted code amount calculating unit for calculating a predicted code amount by multiplying the valid block number relating to the frame to be coded by the proportional constant calculated by the proportional constant calculating unit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 15a, 15b, 15c, and 15d are a collective representation on is a time chart showing the operation of the coding device in the third embodiment;

FIGS. 20a, 20b, 20c, and 20d are a collective representation on a time chart showing the operation of the coding device in the fourth embodiment.

DESCRIPTION OF THE PREFERRED EMBODIMENTS

Embodiment 1

Figure 1:
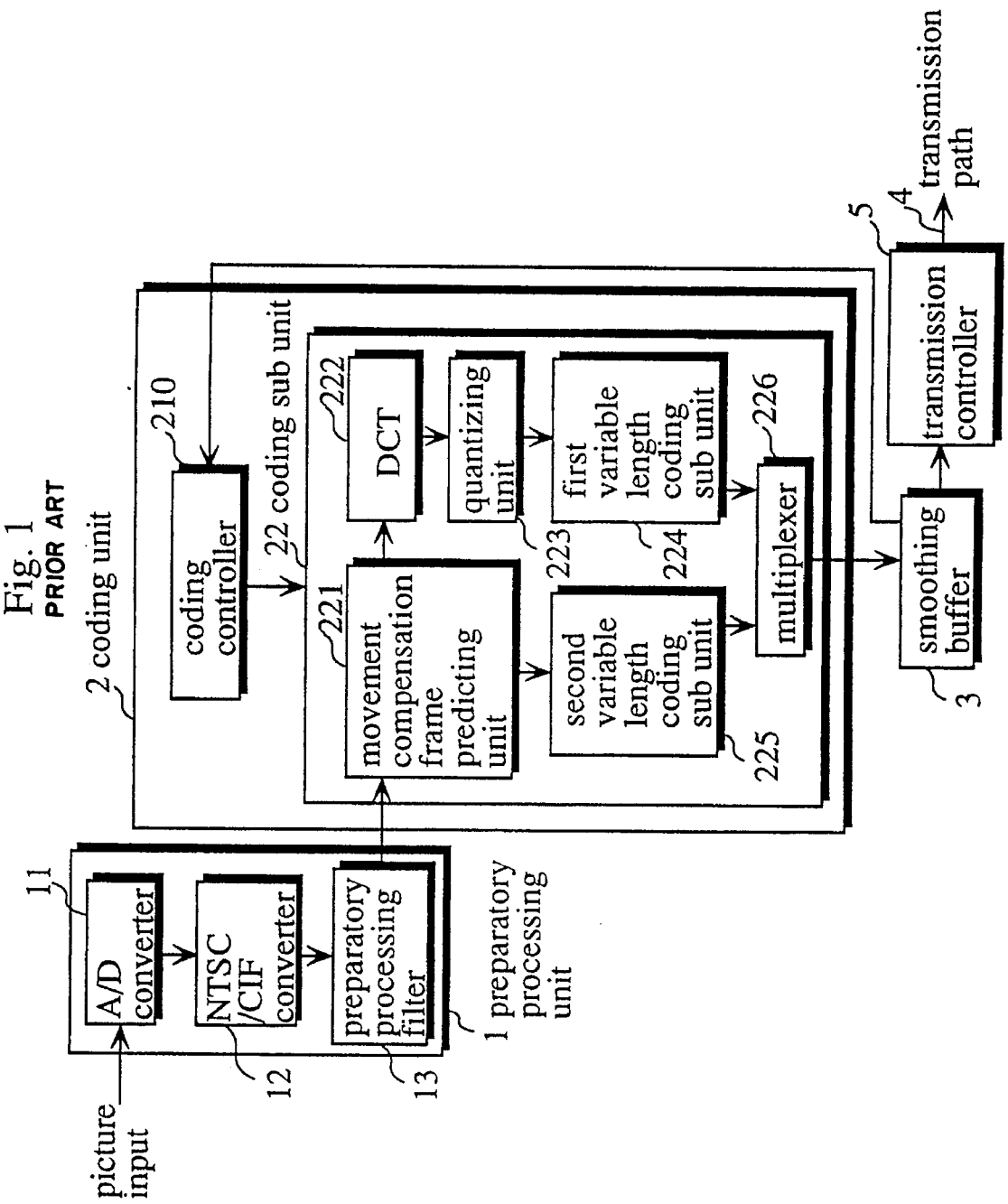
FIG. 1 is a block diagram depicting a coding device which implements a coding method, H.261 advice.
Figure 2:
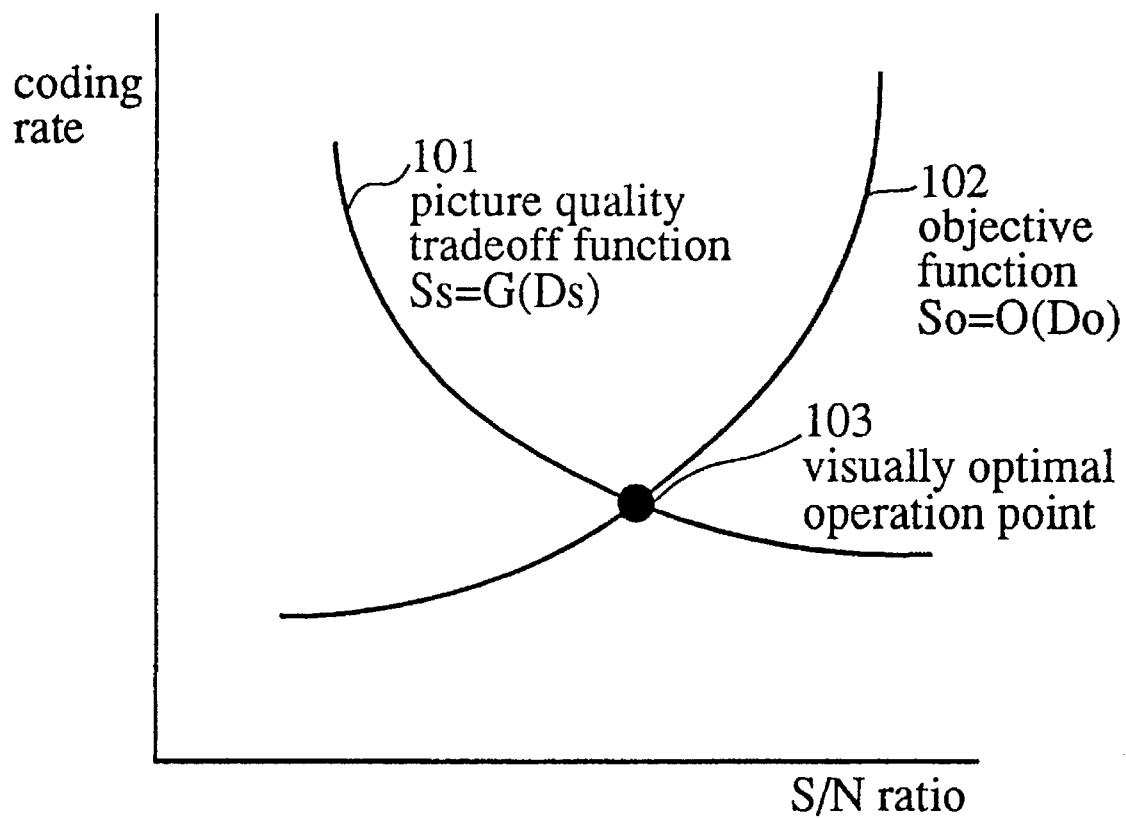
FIG. 2 is a graph showing an example of conventional picture quality tradeoff function Ss.
Figure 3:
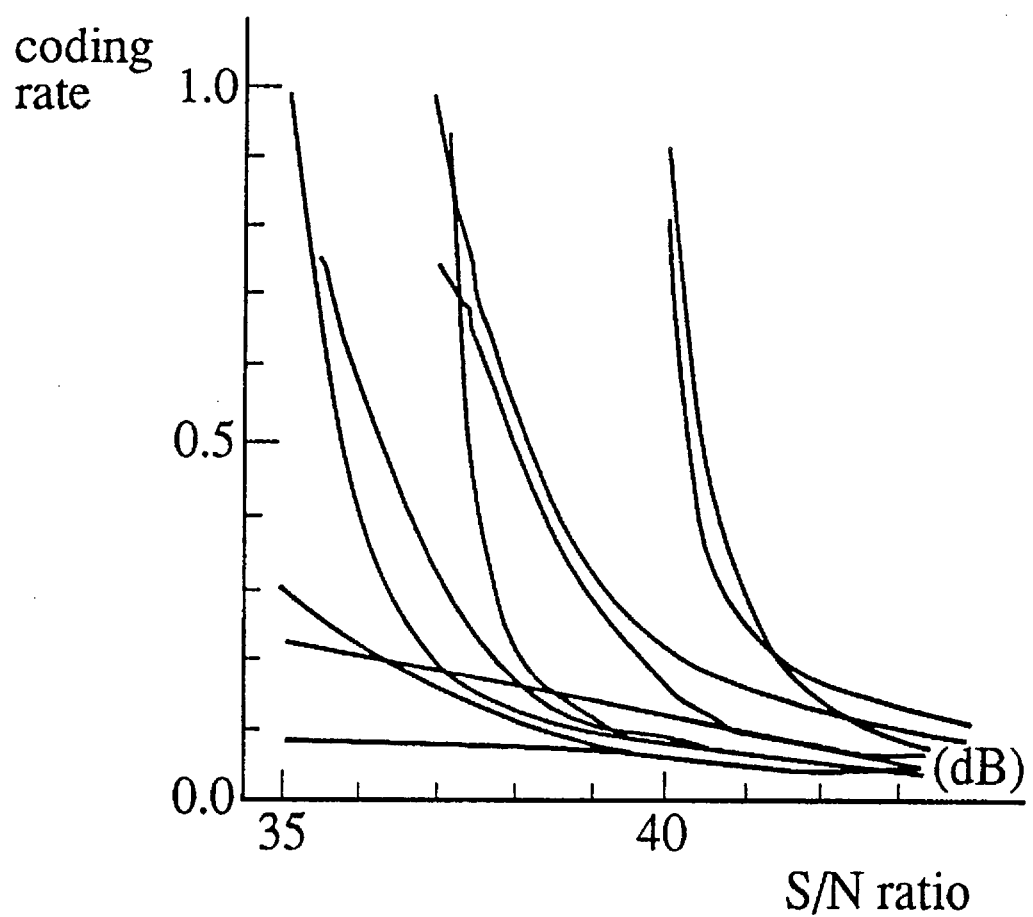
FIG. 3 is a graph showing an example of picture quality tradeoff function Ss cited in a prior art reference.
Figure 4:
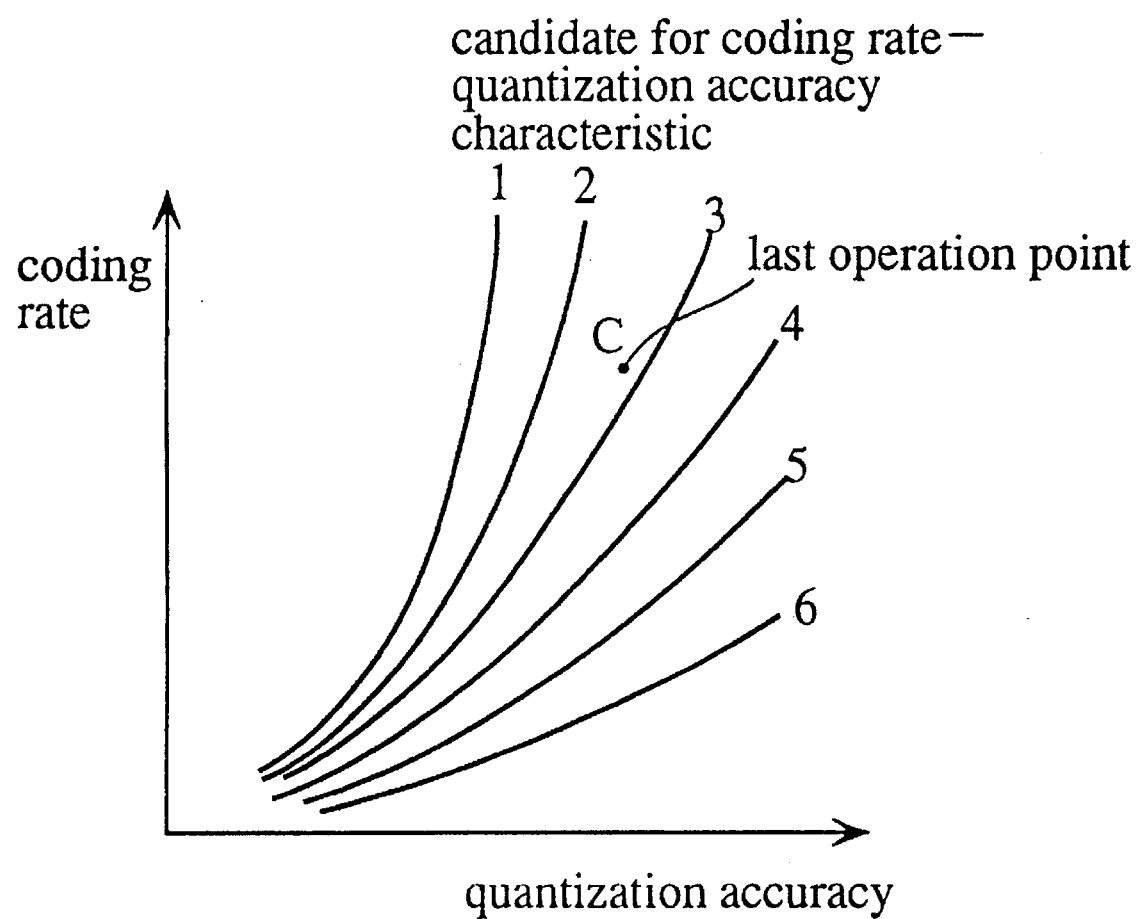
FIG. 4 is a graph showing a second method for estimating a coding rate Ss (q)

A first embodiment of the present invention is described as referring to the drawings.

Figure 5:
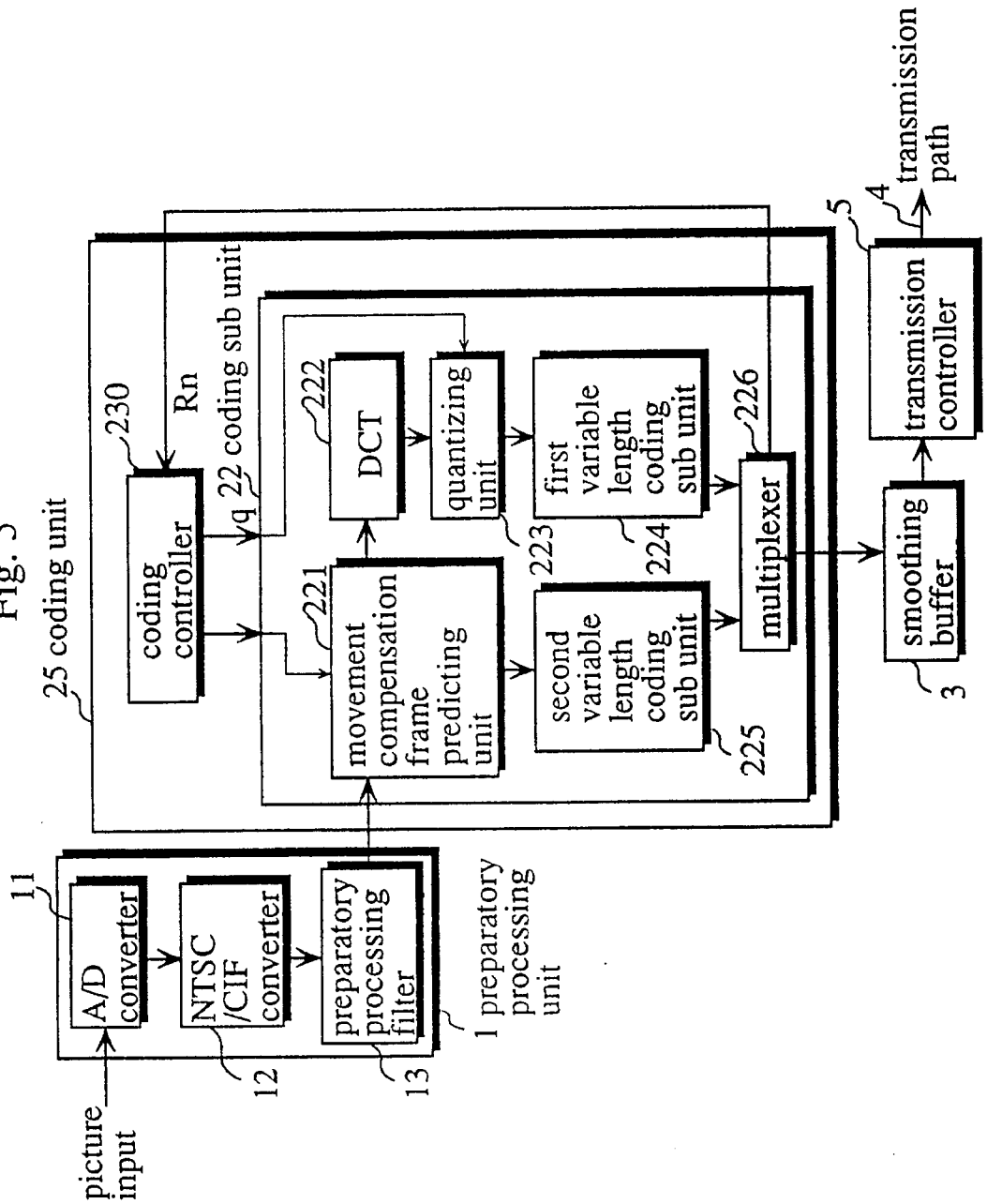
FIG. 5 is a block diagram depicting the entire configuration of a coding device in a first embodiment of the present invention.

FIG. 5 is a block diagram depicting the entire configuration of a coding device in the first embodiment. The coding device in FIG. 5 is substantially same as a conventional coding device in FIG. 1 except a coding controller 230, so that like components are labeled with like numerals with respect to the conventional coding device in FIG. 1.

Figure 6:
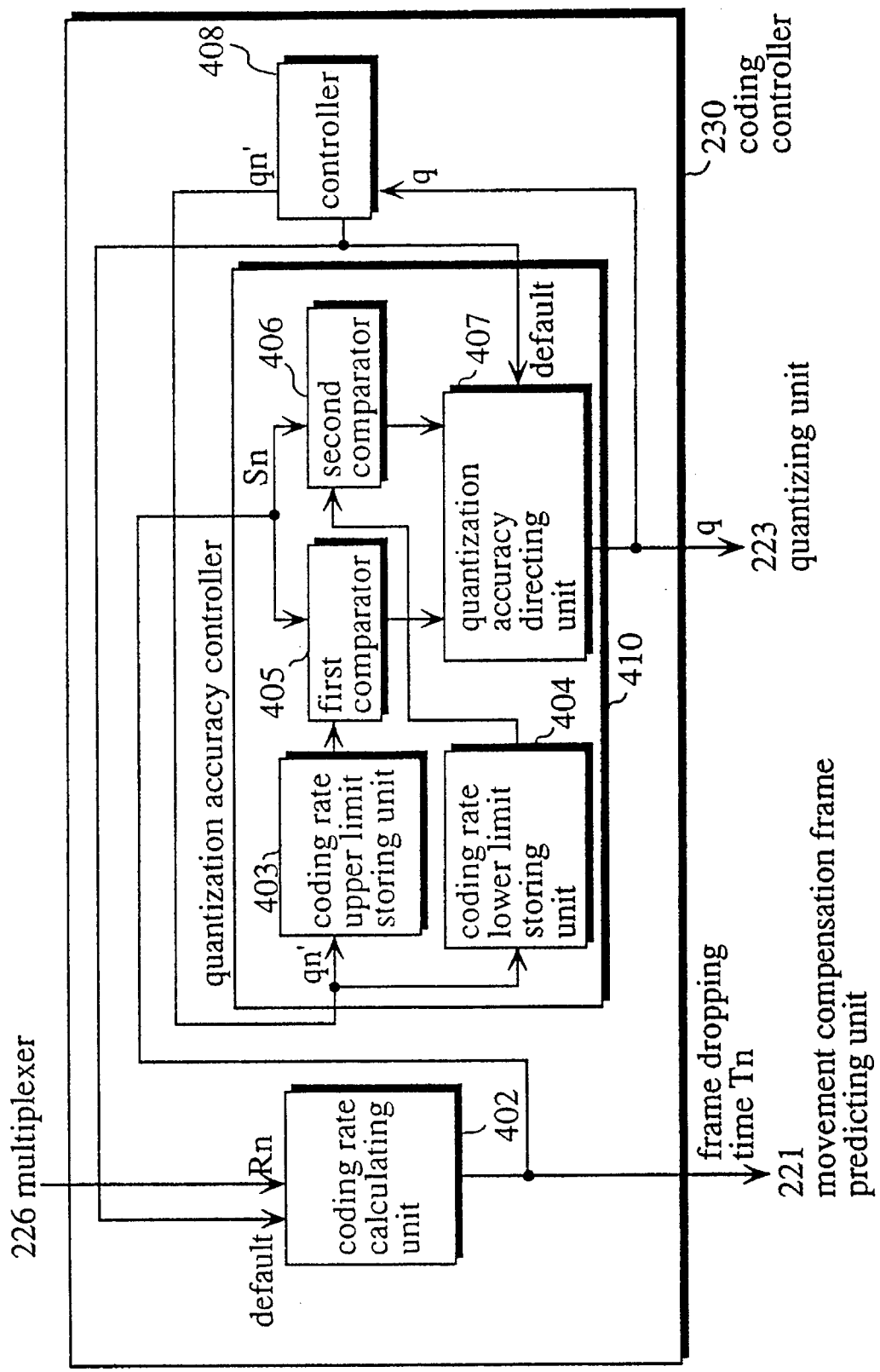
FIG. 6 is a block diagram detailing the configuration of a coding controller 230 in the first embodiment.

FIG. 6 is a block diagram depicting the detailed configuration of the coding controller 230 in the first embodiment. The coding controller 230 comprises a coding rate calculating unit 402, a quantization accuracy controller 410, and a controller 408. The quantization accuracy controller 410 comprises a coding rate upper limit storing unit 403, a coding rate lower limit storing unit 404, a first comparator 405, a second comparator 406, and a quantization accuracy directing unit 407.

The coding rate calculating unit 402 detects a code amount R(q') for a current transmission frame which is constructed by the multiplexer 226, then calculates a coding rate Ss(q') according to an expression Ss(q')=L/R(q'). A current transmission frame is a frame which was coded immediately before a frame which is coded currently. A transmission speed L of the transmission path 4 per one frame period is constant.

According to a remaining storage capacity of the smoothing buffer 3 and a calculated coding rate Ss(q'), the coding rate calculating unit 402 judges if a frame which is to be inputted next should be coded or dropped, and outputs a coding direction signal indicative of the judgement to the movement compensation frame predicting unit 221.

A coding rate upper limit storing unit 403 stores a pair of values comprising a preset quantization accuracy and an upper limit on a coding rate which corresponds to the quantization accuracy. In responding to a quantization accuracy q' outputted from the controller 408, the coding rate upper limit storing unit 403 reads an upper limit value Ssmax (q') on a coding rate which corresponds to the quantization accuracy q' from a recording area, and outputs the upper limit value Ssmax (q') to the first comparator 405.

A coding rate lower limit storing unit 404 stores a pair of values comprising a preset quantization accuracy and an lower limit on a coding rate which corresponds to the quantization accuracy. In responding to a quantization accuracy q' outputted from the controller 408, the coding rate lower limit storing unit 404 reads a lower limit value Ssmin (q') on a coding rate which corresponds to the quantization accuracy q' from a recording area, and outputs the lower limit value Ssmin (q') to the second comparator 406.

The first comparator 405 compares a coding rate Ss (q') calculated by the coding rate calculating unit 402 with upper limit value Ssmax (q') on a coding rate which corresponds to a quantization accuracy q' at that moment.

The second comparator 406 compares a coding rate Ss (q') calculated by the coding rate calculating unit 402 with an lower limit value Ssmin (q') on a coding rate which corresponds to a quantization accuracy q' at that moment.

The quantization accuracy directing unit 407 stores a value by which a quantization accuracy is changed, detects the compared results from the first comparator 405 and the second comparator 406, and sets a quantization accuracy q for the next coding. If a coding rate Ss (q') is greater than an upper limit value Ssmax (q'), the quantization accuracy directing unit 407 increases a quantization accuracy q'. If a coding rate Ss (q') is smaller than a lower limit value Ssmax (q'), the quantization accuracy directing unit 407 decreases a quantization accuracy q'. If a coding rate Ss(q') is neither Greater than an upper limit value Ssmax (q') nor smaller than a lower limit value Ssmax (q'), the quantization accuracy directing unit 407 sets a quantization accuracy q which is identical to a quantization accuracy q'. After setting a quantization accuracy q depending on above cases, the quantization accuracy directing unit 407 outputs the quantization accuracy q to the quantizing unit 223 and the controller 408.

The controller 408 stores a quantization accuracy q outputted from the quantization accuracy directing unit 407 temporarily, and outputs the quantization accuracy q to the coding rate upper limit storing unit 403 and the coding rate lower limit storing unit 404 when the next coding starts. The controller 408 outputs default signal which instructs initializing to the coding rate calculating unit 402 and the quantization accuracy directing unit 407 when the coding device starts its operation. According to the default signal, the coding rate calculating unit 402 and the quantization accuracy directing unit 407 initialize themselves with initial values stored in themselves.

Note that the coding rate upper limit storing unit 403 and the coding rate lower limit storing unit 404 do not necessarily store an upper limit value and a lower limit value on a coding rate according to every quantization accuracy. Instead, a plurality of representative quantization accuracies may be set beforehand, and the coding rate upper limit storing unit 403 stores pairs each including a representative quantization accuracy and an upper limit value on a coding rate, and the coding rate lower limit storing unit 404 stores pairs each including a representative quantization accuracy and a lower limit value on a coding rate. In this case, the coding rate upper limit storing unit 403 and the coding rate lower limit storing unit 404 detect a representative quantization accuracy which is the closest to a quantization accuracy which was employed to code a current transmission frame, and outputs an upper limit value and a lower limit value on a coding rate which correspond to the detected representative quantization accuracy to the first comparator 405 and the second comparator 406 respectively.

Figure 7:
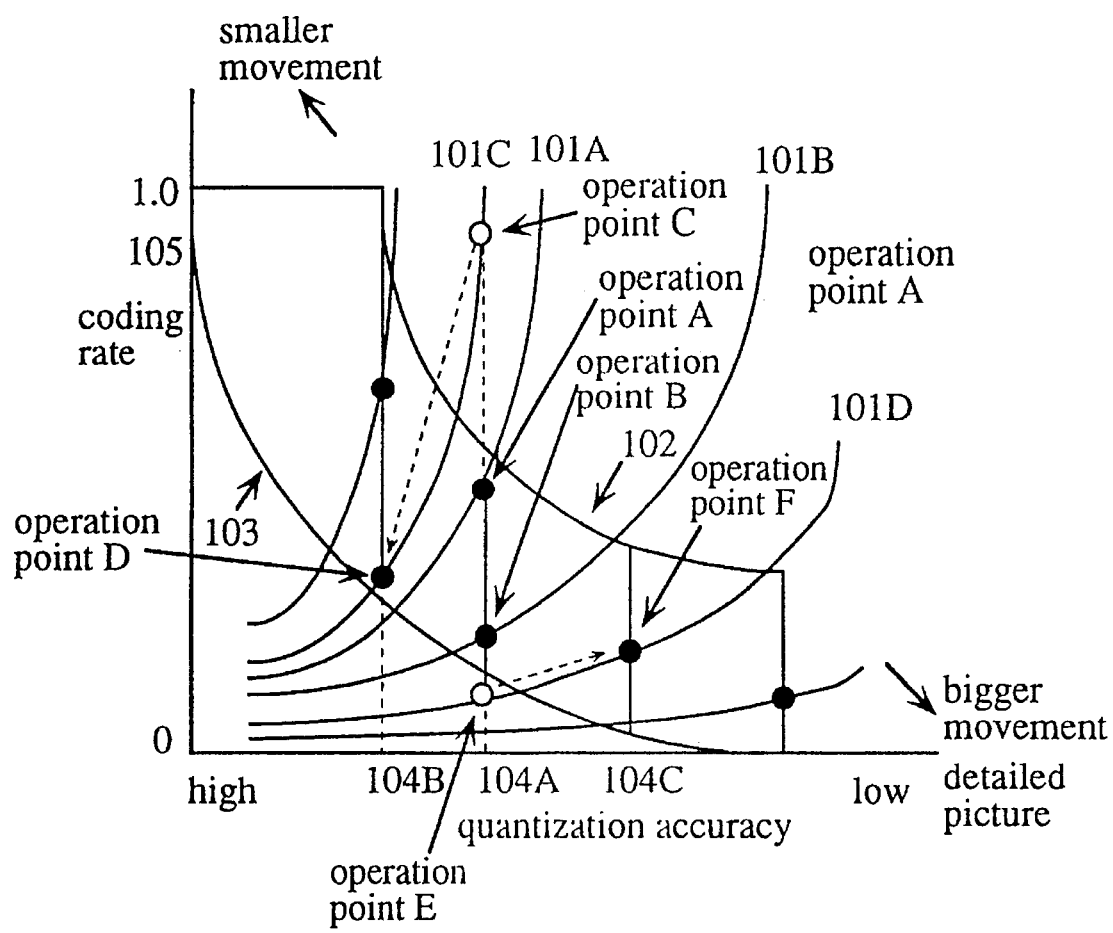
FIG. 7 is a graph showing a principle of a coding control method in the first embodiment.

FIG. 7 is a graph explaining a principle of a coding control method in the first embodiment. Curves 101 are coding rate-quantization accuracy characteristic curves which are expressed by Ss(q)=L/R(q), in which Ss (q) is a coding rate; L is a bit number which is transmitted per one frame period; q is a quantization accuracy; and R(q) is a code amount which is generated when a frame is coded with a quantization accuracy q. In FIG. 7, the vertical axis and the horizontal axis represent a coding rate Ss (q) and a quantization accuracy q respectively. A quantization accuracy q is decreased from left to right of the horizontal axis; accordingly, spatial distortion in a display picture is increased. A coding rate is decreased from top to bottom of the vertical axis, so that frames are dropped at a higher rate; accordingly, time distortion in a display picture is increased. Coding rate-quantization accuracy characteristics vary depending on the size of movement along with time and a spatial frequency component of an input picture. The curves 101 in FIG. 7 which represent coding rate-quantization accuracy characteristics move in the lower right hand direction when a display picture includes a big movement or a finely drawn pattern, while they move in the upper left hand direction when a display picture includes few movement. Coding rate-quantization accuracy characteristics are set forth in the description of the related art, and the description is not repeated herein. Only a coding rate-quantization accuracy characteristic is employed as a picture quality tradeoff function in this embodiment.

An upper limit curve 102 is drawn by linking upper limit values on optimal coding rates of the curves 101, and a lower limit curve 103 is drawn by linking lower limit values on optimal coding rates of the curves 101. More specifically, a visually optimal area is supposedly set on each curve 101. The upper limit curve 102 for an optimal coding rate is obtained by linking points each representing a maximum coding rate within this visually optimal area, and the lower limit curve 103 for an optimal coding rate is obtained by linking points each representing a minimum coding rate within the same area.

Conventionally, it is assumed that an objective function is a collection of points each of which represents a visually optimal pair of a coding rate 105 and a quantization accuracy 104; however, this objective function is obtained subjectively, and it varies depending on the distance and the angle from which a screen is viewed, or a user's taste. Therefore, an operation point is placed within an area which is located between an upper limit value and a lower limit value on an optimal coding rate in this embodiment.

Figure 8:
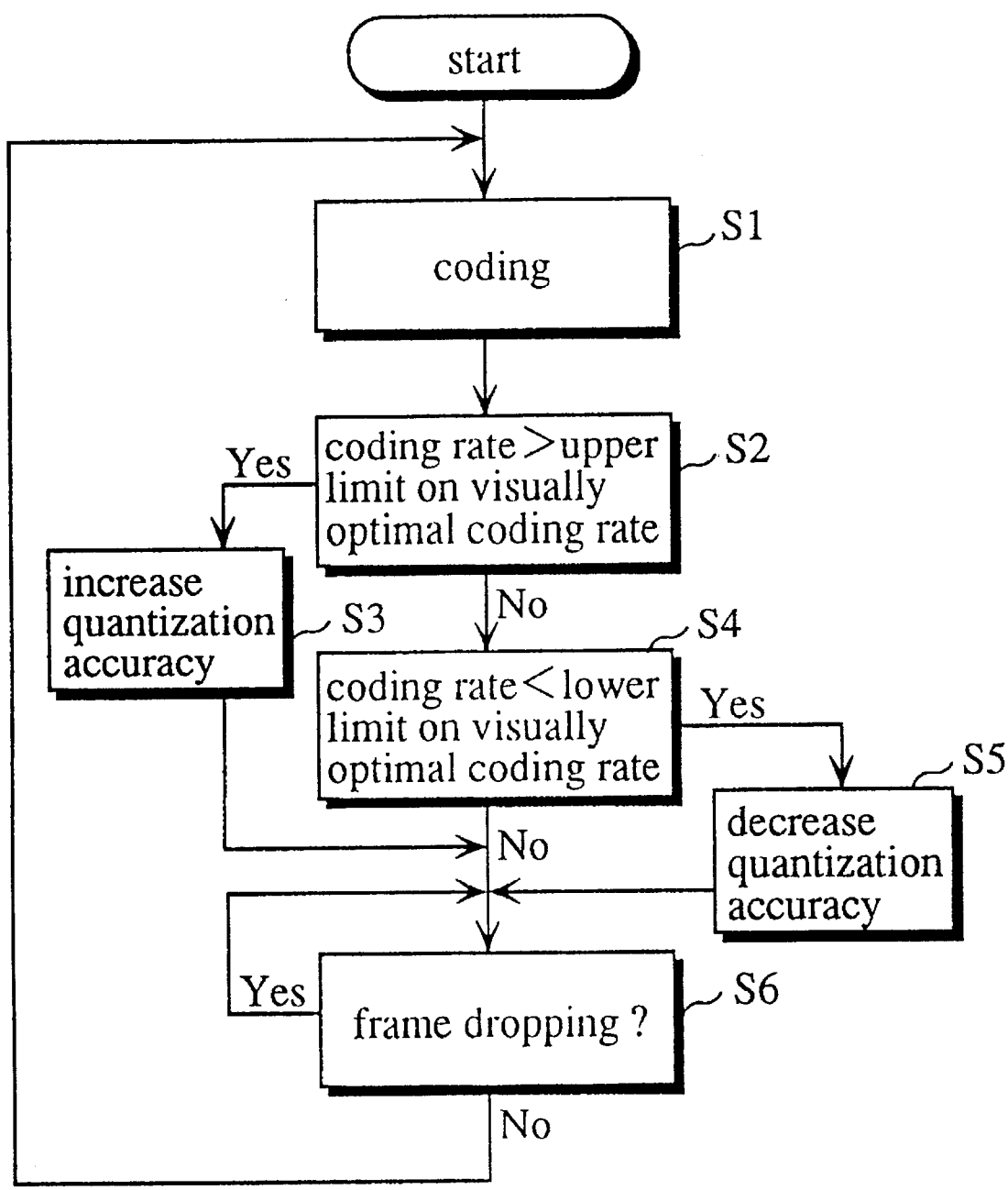
FIG. 8 is a flow chart describing the coding control method in the first embodiment.

FIG. 8 is a flow chart describing a coding control method in this embodiment. The operation of the coding control method in this embodiment is described as referring to FIGS. 7 and 8.

In FIG. 8, an input frame is coded with a preset quantization accuracy (Step S1). If a coding rate exceeds upper limit on an optimal coding rate, the quantization accuracy is increased (Step S2, Step S3). If a coding rate is smaller than lower limit on an optimal coding rate, the quantization accuracy is decreased (Step S4, Step S5). If frame dropping is operated, standby continues until the next frame is inputted. If frame dropping is not operated, the next coding is operated with the quantization accuracy which is set at S2–S5 (Step S6). Thus, coding is controlled by repeating S1–S6.

A specific example of the coding control is described in detail as referring to FIGS. 7 and 8. An input picture frame is coded with a quantization accuracy 104A (Step S1). If a coding rate-quantization accuracy characteristic for the input picture frame is either a curve 101A or a curve 101B in FIG. 7, an operation point A or an operation point B is within a visually optimal area, since neither the operation point A nor the operation point B exceeds upper limit on an optimal coding rate; at the same time neither the operation point A nor the operation point B is smaller than lower limit on an optimal coding rate. Therefore, the quantization accuracy 104A remains unchanged (Step S2–S5); frames are dropped according to a generated code amount (Step S6); then the next coding starts (Step S1).

If a coding rate-quantization accuracy characteristic of an input picture frame becomes a curve 101C after repeating codings with the quantization accuracy 104A, the operation point becomes a transitional operation point C. Since a coding rate of the operation point C exceeds upper limit on an optimal coding rate which corresponds to the quantization accuracy 104A, the quantization accuracy is increased (Step S2, Step S3) to be a quantization accuracy 104B. Then, frames are dropped according to a generated code amount, and the next coding is operated with the increased quantization accuracy 104B (Step S1). If the coding rate-quantization accuracy characteristic 101C of an input picture frame remains unchanged, the next operation point will be an operation point D which is placed within an area providing an optimal coding rate which achieves an optimal balance of movement reproductivity and spatial resolution.

Similarly, if a coding rate-quantization accuracy characteristic shifts from the curve 101B to the curve 101D during coding with the quantization accuracy 104A, the operation point will be a transitional operation point E. Since a coding rate is smaller than lower limit on an optimal coding rate, the quantization accuracy is decreased to a quantization accuracy 104C (Step S4, Step S5). Subsequently, frames are dropped according to a generated code amount, then an input picture is coded with the quantization accuracy 104C (Step S1). If a coding rate-quantization accuracy characteristic represented by the curve 101D remains unchanged, the next operation point will be an operation point F which is placed within the area providing an optimal coding rate which achieves an optimal balance of movement reproductivity and spatial resolution.

Thus, according to the coding control method in this embodiment, an optimal balance of movement reproductivity, spatial resolution, and noise can be obtained with simple control. An optimal operation area can be defined in detail by setting a narrower operation range of quantization accuracy. However, the speed for following a change in input frames is decreased, and the control itself will be damaged if it cannot follow a change in input frames. On the other hand, the speed for following a change in input frames is increased by setting a wider operation range of quantization accuracy. However, an operation area is enlarged, so that control accuracy is degraded. Therefore, an operation range of quantization accuracy is set to admit some dispersion unless a change in a display picture due to the dispersion is not visually notified by the user.

Embodiment 2

A second embodiment of the present invention is explained as referring to the drawings.

Figure 9:
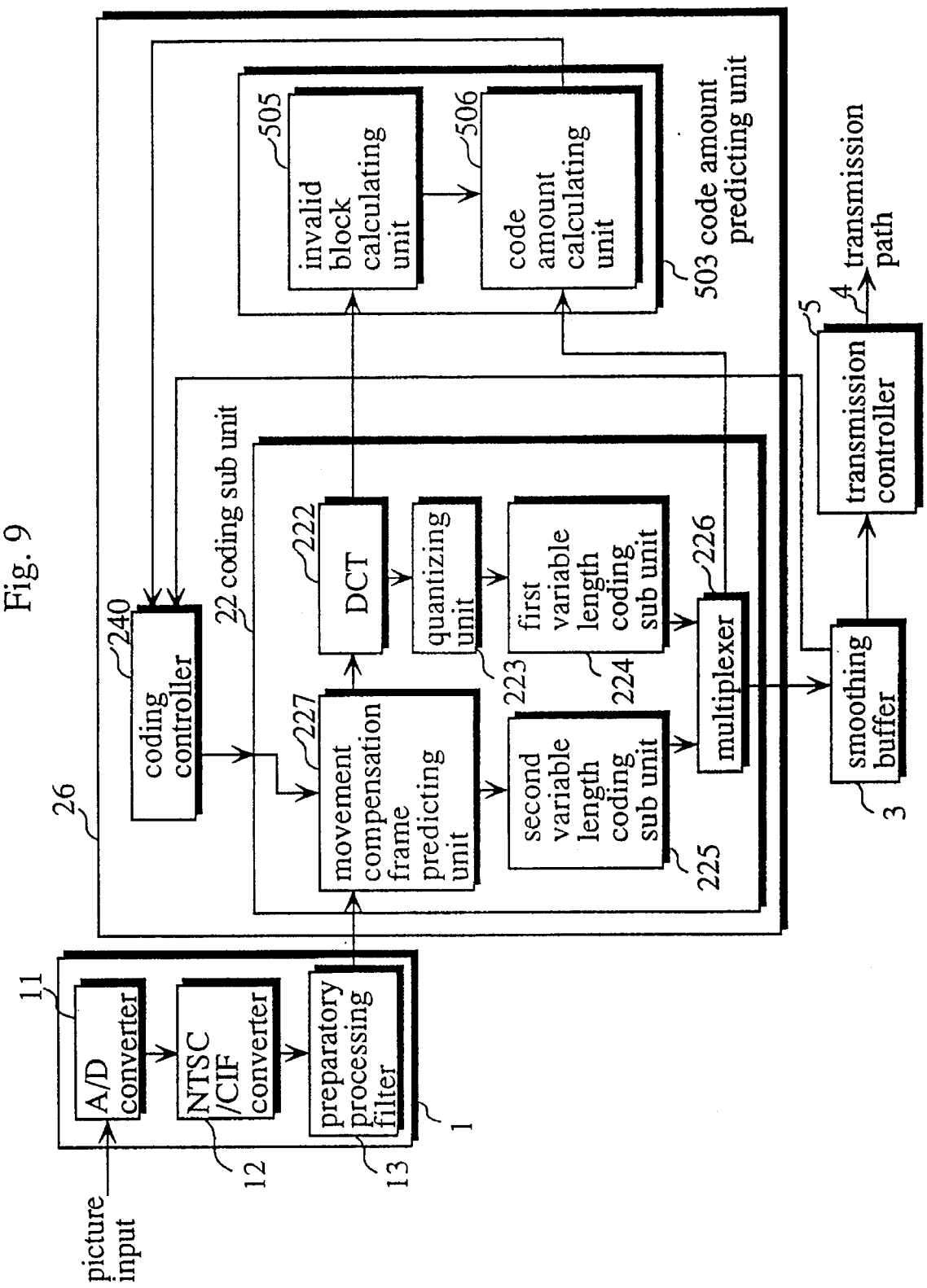
FIG. 9 is a block diagram depicting the entire configuration of a coding device in a second embodiment of the present invention.

FIG. 9 is a block diagram depicting the entire configuration of a coding device in this embodiment. In addition to the components of the conventional coding device, the coding device in this embodiment includes a code amount predicting unit 503. The code amount predicting unit 503 includes an invalid block calculating unit 505 and a code amount calculating unit 506.

In addition to the capabilities of the conventional movement compensation frame predicting unit 221, the movement compensation frame predicting unit 221 obtains an error between frames to predict a code amount which will be generated in responding to a direction from the coding controller 240. An error between frames is obtained by simply taking a difference between a current frame to be coded and a frame which was coded the last time without compensating for movement.

The invalid block calculating unit 505 compares a DCT coefficient which is obtained by DCT converting an error between frames with the DCT 222 with a first level of quantization, sets a block no DCT coefficient of which reaches the first level as an invalid block, and calculates a total number of invalid blocks. The first level of quantization is a matrix including preset numbers.

According to the calculated result from the invalid block calculating unit 505, the code amount calculating unit 506 calculates a total number of valid blocks by subtracting a invalid blocks from a total number of blocks, then predicts a code amount which will be generated for a frame which is subjected to code amount prediction according to the calculated valid blocks.

It is found from an experiment that, when an error is obtained between a frame which is subjected to code amount prediction and a frame which was inputted just before this frame, a predicted code amount is proportional to the number of valid blocks which is based on the error. However, different proportional constants are applied to different input picture frames. Therefore, the code amount calculating unit 506 calculates a ratio of an actually generated code amount for a last input frame detected by the multiplexer 226 to a valid block number which is obtained based on an error between the respective frames upon each coding, and sets it as a proportional constant to be employed in the next code amount prediction.

Note that an error is not always obtained between two frames which are inputted continuously. Because of a frame dropping, a frame which is coded immediately before a frame which is subjected to code amount prediction is not always a frame which was inputted immediately before the same frame. However; approximately, it is assumed that a code amount for a frame to be coded next is predicted herein.

The coding controller 240 directs the movement compensation frame predicting unit 227 to obtain an error between frames upon each input of a new frame to the movement compensation frame predicting unit 227. Subsequently, the coding controller 240 directs the code amount predicting unit 503 to predict a code amount which will be generated based on the obtained error between frames, and detects a remaining storage capacity of the smoothing buffer 3. The coding controller 240 compares the remaining storage capacity of the smoothing buffer 3 and the predicted code amount. If the predicted code amount is smaller than the remaining storage capacity, the coding controller 240 directs the movement compensation frame predicting unit 227 to operate prediction coding with movement compensation.

Figure 10A:
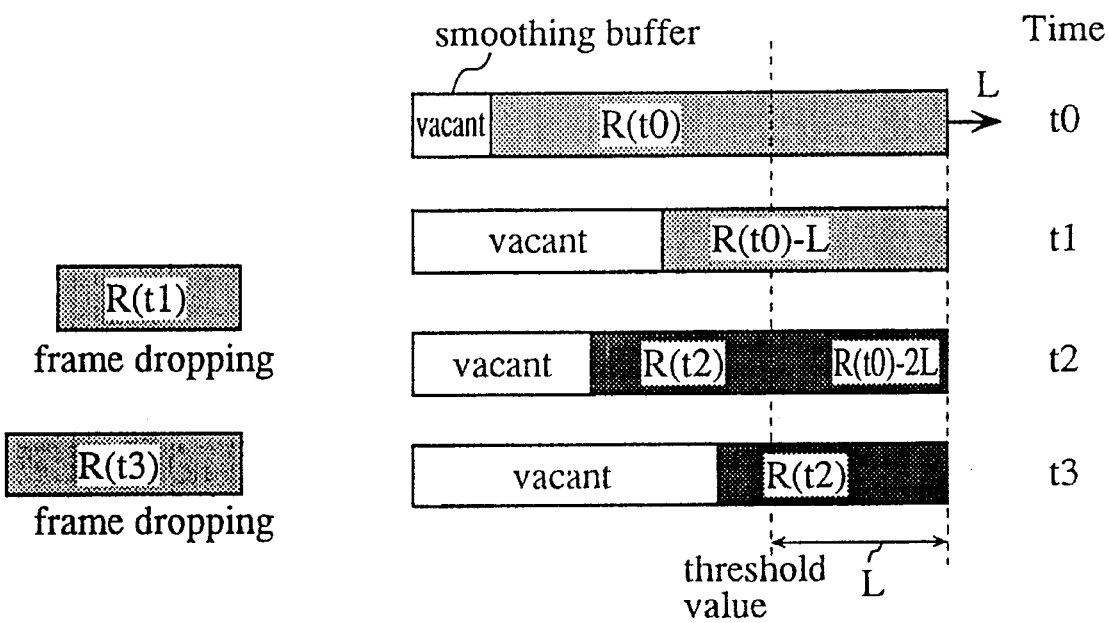
FIG. 10 contrasts a change in a code amount within a smoothing buffer 3 to that relating to a conventional method.
Figure 10B:
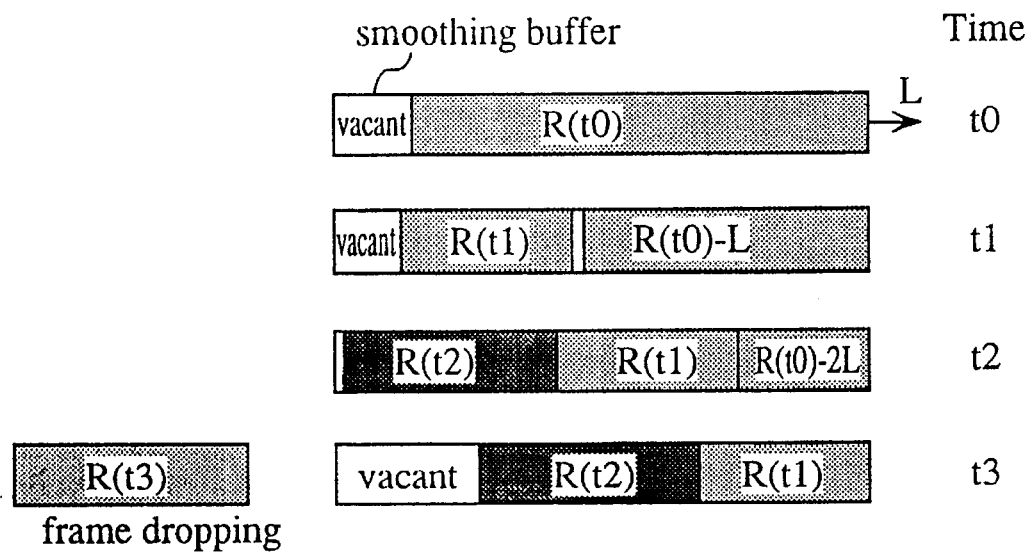
Figure 11:
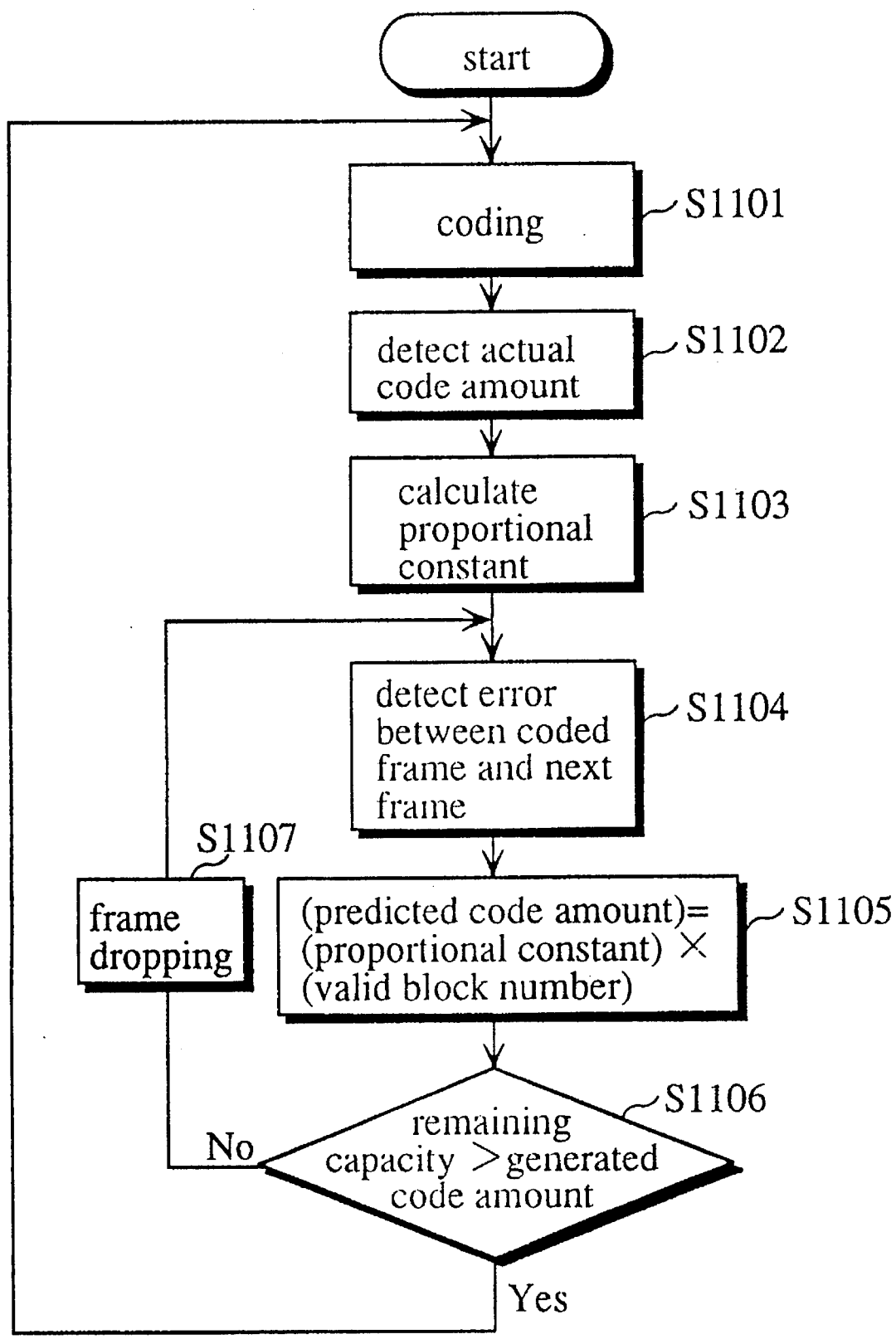
FIG. 11 is a flow chart describing a coding control algorithm in the second embodiment.

FIG. 10 contrasts a change in the amount of codes within the smoothing buffer 3 to that relating to the conventional method. FIG. 11 is a flow chart describing a coding control method algorithm in the second embodiment. FIG. 10(a) shows a change in the amount of codes within the smoothing buffer 3 according to the conventional frame dropping control method, and FIG. 10(b) shows a change in the amount of codes within the smoothing buffer 3 according to the frame dropping control method in the second embodiment.

Time t0

As shown in FIGS. 10(a) and 10(b), with both the conventional method and this embodiment, a code amount $R(t0)=R'(t0)$ is generated when a first frame is coded. It is assumed that the coded first frame is written into the respective smoothing buffer 3 (Step S1101–1103). R(t) represents a code amount which is generated with the conventional coding method, and R'(t) represents a code amount which is generated in this embodiment. A transmission speed of the communication path 4 is constant in both cases (L bits per one frame period), and each frame is coded in one frame period.

Time t1

According to the conventional method, an Lbit code amount was already transmitted from the smoothing buffer 3, so that a remaining code amount B(t1) within the smoothing buffer 3 is $B(t1)=R(t0)-L$. As shown in FIGS. 10(a) and 10(b), $B(t1)=R(t0)-L>L$, so that the coding controller 210 decides to drop the second frame.

According to the method in this embodiment, the coding controller 240 compares a code amount R'(t1) which will be generated for the second frame from the code amount predicting unit 503 with a remaining storage capacity of the smoothing buffer 3 (Step S1104–Step 1106). The predicted code amount R'(t1) for the second frame is smaller than a remaining storage capacity of the smoothing buffer 3, so that the coding unit 2 codes a prediction error between the second frame and the first frame, and writes the coded result into the smoothing buffer 3 (Steps S1101–S1103).

Time t2

According to the conventional method, a remaining code amount B(t2) of the smoothing buffer 3 is $B(t2)=R(t0)-2L<L$ since two frame periods have been passed since the time t0. Accordingly, the coding controller 210 decides to code the third frame, and the coding unit 2 codes a prediction error between the third frame and the first frame.

According to this embodiment, the code amount predicting unit 503 predicts a code amount R'(t2) which will be generated when the third frame is coded (Step S1104, Step S1105). Since the predicted code amount R'(t2) is smaller than a remaining storage capacity of the smoothing buffer 3 (Step S1106), a prediction error between the third frame and the second frame is coded, and the coded result is written into the smoothing buffer 3 (Step S1101–Step S1103).

Time t3

According to the conventional method, a remaining storage capacity B (t3) of the smoothing buffer 3 is $B(t3)=R(t0)+R(t2)3L>L$, so that the coding controller 210 decides to drop the fourth frame.

According to the method in this embodiment, the code amount predicting unit 503 predicts a code amount R'(t3) which will be generated when the fourth frame is coded (Steps S1104, S1105). The predicted code amount R'(t3) is greater than a remaining storage capacity of the smoothing buffer 3 (Step 1106), so that the coding controller 240 decides to drop the fourth frame (Step S1107).

Thus, according to the conventional method, the first frame is employed as a reference frame in coding the third frame. On the other hand, according to the method in this embodiment, the second frame which is more closely related to the third frame than the first frame is employed as a reference frame in coding the same. Therefore, compared to the conventional method, compression efficiency in coding the third frame is improved. As a result, a code amount R'(t2) which is generated when the third frame is coded according to this embodiment is smaller than a code amount R(t2) which is generated when the third frame is coded according to the conventional method.

In this embodiment, frame droppings are reduced by managing a remaining storage area of the smoothing buffer 3 effectively. Therefore, prediction coding can be applied to two frames which are related to each other more closely. Frame droppings are reduced in this embodiment, so that a further reduction of frame droppings is achieved up to a next scene change, or until a picture with big movement or a detailed picture is inputted next. Consequently, movement reproductivity is improved steadily.

With the coding method in this embodiment for predicting a code amount which will be generated when a next frame is coded, there will not be a significant error in employing a code amount generated for a frame which was coded the last time as a predicted code amount if the frames are closely related to each other. However, the thus obtained predicted code amount cannot be applied to a picture in which scenes change frequently. This problem is overcome in this embodiment by calculating a total number of invalid blocks as the calculated total number is related to the amount of information which will be generated. Further, as movement is not compensated when an error between frames is detected, the time taken to obtain a movement vector can be shortened. As a result, compared to a method for detecting a code amount according to actual coding, processing time which is required to predict a code amount for a next frame is reduced by large.

Even when the same frame is coded with the same quantization accuracy, a code amount can be reduced by obtaining a prediction error between frames which are more closely related to each other. Each characteristic curve on coordinates set forth in the Related Art and the first embodiment does not reflect a different number of frame droppings or a change in a code amount which is resulted from a different number of frame droppings. Accordingly, an operation point for a next frame is moved onto a different characteristic curve depending on a frame dropping number. An operation point is moved onto a characteristic curve with an improved coding rate even when the same quantization accuracy is employed in this embodiment. Therefore, by combining the coding control method in this embodiment with that in the first embodiment, movement reproductivity is enhanced if spatial resolution remains the same; otherwise, spatial resolution is enhanced if movement reproductivity remains the same. Thus, a device and a method for controlling coding which maintain an optimal balance of movement reproductivity, spatial resolution, and noise with simple control can be provided by combining the first embodiment and the second embodiment.

Embodiment 3

A third embodiment of the present invention is described as referring to the drawings.

Figure 12:
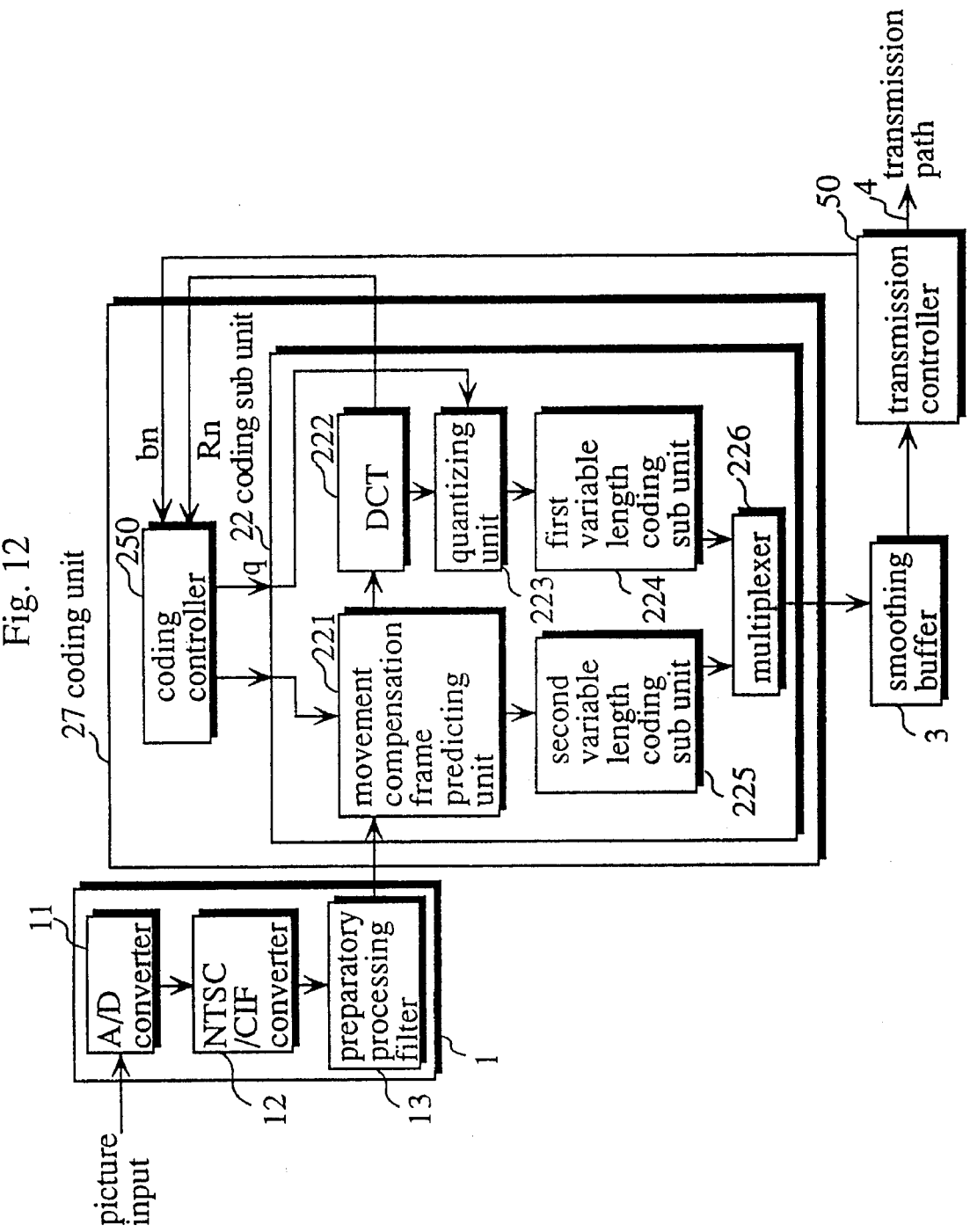
FIG. 12 is a block diagram depicting the entire configuration of a coding device in a third embodiment of the present invention.
Figure 13:
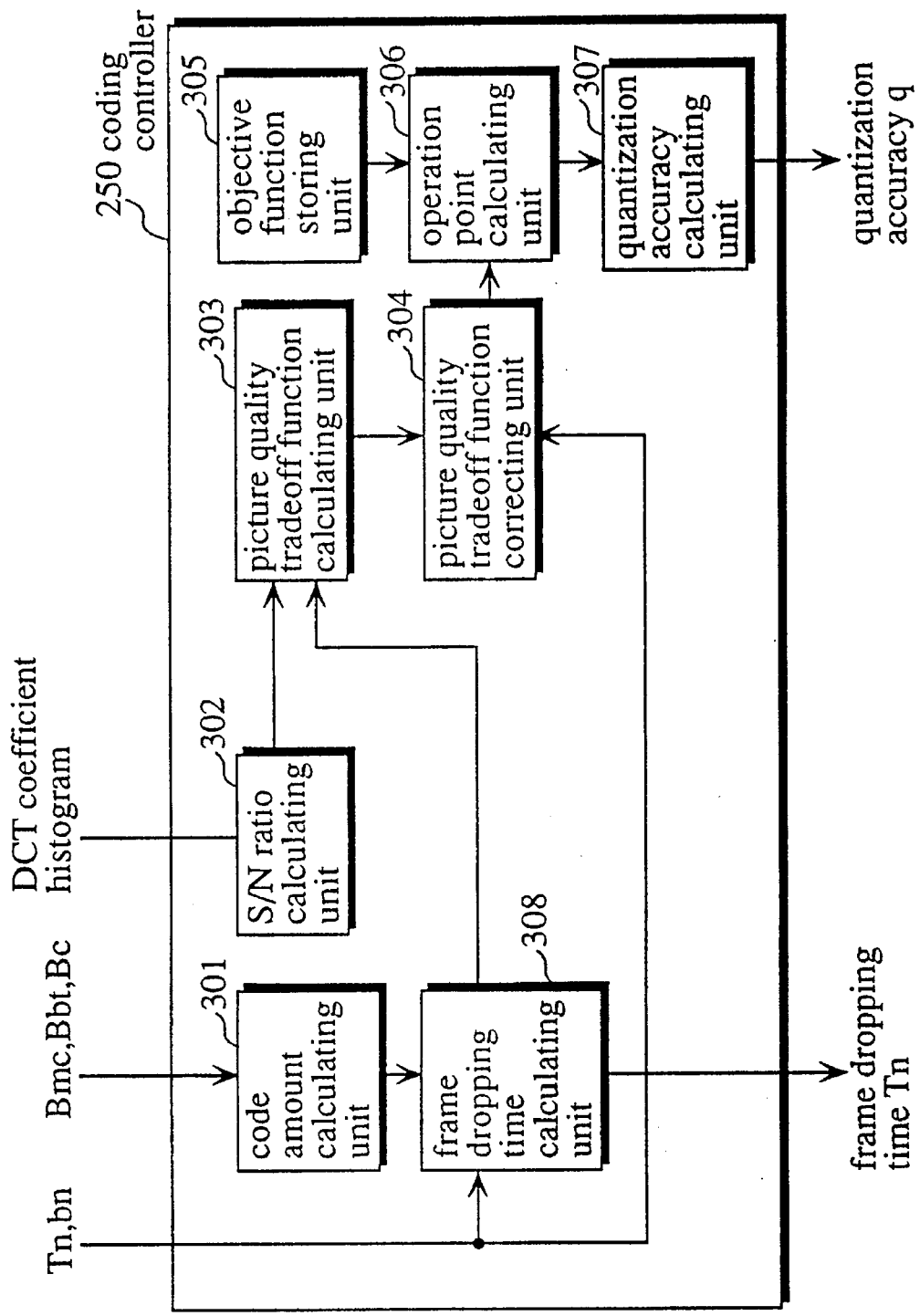
FIG. 13 is a block diagram depicting the configuration of a coding controller 250 in the third embodiment.

FIG. 12 is a block diagram depicting the entire configuration of a coding device in the third embodiment. FIG. 13 is a block diagram depicting the configuration of a coding controller 250 in the third embodiment. The coding device in this embodiment is substantially same as the conventional coding device except the coding controller 250 and the transmission controller 50, so that like components are labeled like reference numerals with respect to those of the conventional coding device.

The coding controller 250 comprises a code amount calculating unit 301, an S/N ratio calculating unit 302, a picture quality tradeoff function calculating unit 303, a picture quality tradeoff function correcting unit 304, an objective function storing unit 305, an operation point calculating unit 306, a quantization accuracy calculating unit 307, and a frame dropping time calculating unit 308.

After a frame to be coded is DCT converted, the code amount calculating unit 301 calculates a code amount $R(q)$ by substituting a code amount BmC which represents a movement compensation vector, a code amount Bbt which represents a block type, and a code amount Bc which represents a quantization index of a DCT coefficient to an expression (A.2) cited in the appendix 2 of the reference.

The S/N ratio calculating unit 302 calculates an S/N ratio according to a DCT coefficient histogram.

The picture quality tradeoff function calculating unit 303 stores a picture quality tradeoff function $Ss=Ga(Ds)$ as a calculation procedure by which an S/N ratio $Ds(q)$ and a coding rate $Ss(q)$ are obtained with a quantization accuracy q as a parameter. A picture quality tradeoff function $Ss=Ga(Ds)$ is obtained by eliminating the parameter q from an expression (1) in a text 2 of the reference, that is $S(t)=L/R(t)$ and from an equality which represents an S/N ratio $Ds(q)$ cited in an appendix 2 of the reference.

The picture quality tradeoff function correcting unit 304 calculates a code amount $(L \cdot P \cdot Tn - bn)$ which has not been transmitted according to a code amount bn from the transmission controller which has been transmitted. L represents bits to be transmitted per one frame period, and P represents frames to be inputted to the coding unit 27 per a second. Tn represents the time which goes on since coding of a n-th frame starts until the next coding starts, and bn represents bits which were transmitted safely within the time Tn. Clearly, $(L \cdot P \cdot Tn - bn)$ represents bits which could not be transmitted due to a decreased transmission speed although they should have been transmitted within the time since coding of a n-th frame starts until the next coding starts. The picture quality tradeoff function correcting unit 304 corrects the expression (1) cited in the text 2 of the reference, that is $S(t)=L/R(t)$ into $S(q)=L/\{R(q)+L \cdot P \cdot Tn - bn\}$. A corrected picture quality tradeoff function $Ss=Gb(Ds)$ is obtained by eliminating the parameter q from an equality which represents the thus obtained corrected coding rate $S(q)$ and from the equality which represents an S/N ratio $Ds(q)$ cited in the appendix 2 of the reference.

The objective function storing unit 305 stores a preset objective function $So=O(Do)$.

The operation point calculating unit 306 calculates an operation point for the next coding which is an intersecting point of the corrected picture quality tradeoff function $Ss=Gb(Ds)$ and the preset objective function $So=O(Do)$.

The quantization accuracy calculating unit 307 calculates a quantization accuracy q for the next coding according to the calculated operation point.

The frame dropping time calculating unit 308 calculates a coding rate Sn from a code amount calculated by the code amount calculating unit 301, then calculates a frame dropping time Tn.

The transmission controller 50 calculates a code amount bn for a current transmission frame which could be transmitted safely until the next coding starts, and outputs the calculated code amount bn to the coding controller 250.

Figure 14:
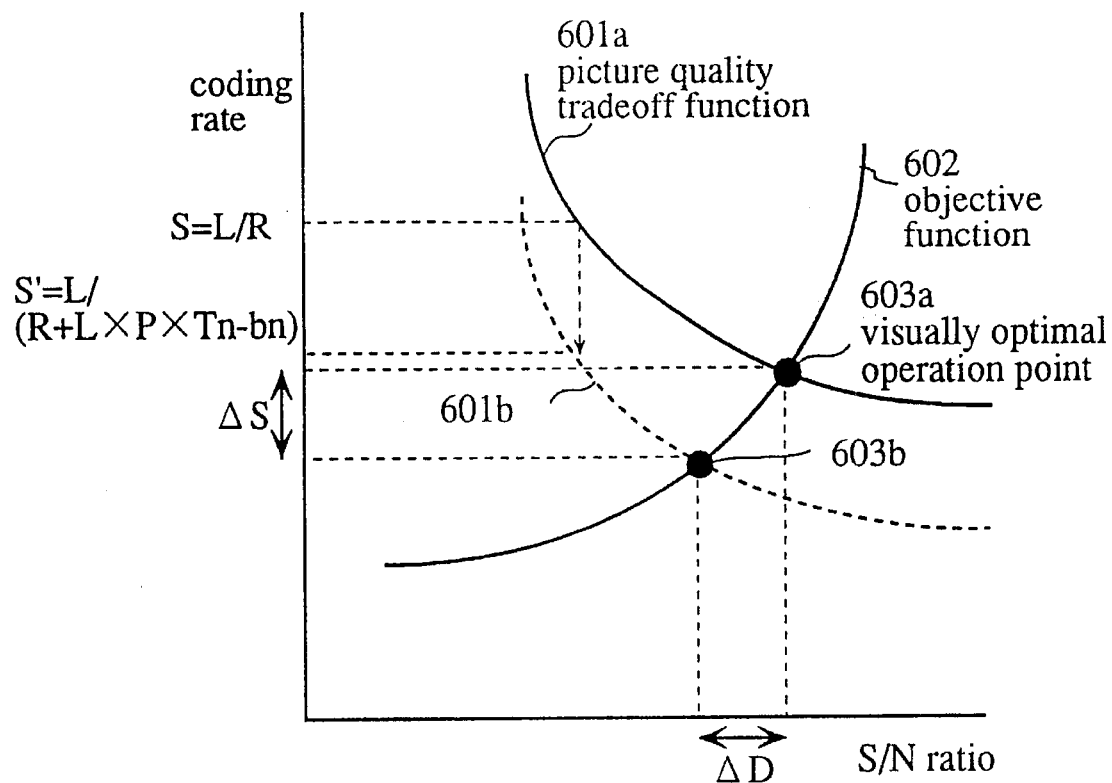
FIG. 14 is a graph explaining a principle of a coding control method in the third embodiment.

FIG. 14 explains a principle of the coding control method in the third embodiment. A curve 601a represents a picture quality tradeoff function $Ss=Ga(Ds)$ when a transmission speed of the transmission path 4 is $L \cdot P(bit/s)$. Note that this picture quality tradeoff function $Ss=Ga(Ds)$ is the coding rate Ss-S/N ratio Ds characteristic which was set forth in the related art. L represents bits to be transmitted per one frame period, and P represents frames to be inputted to the coding unit 27 per a second. A picture quality tradeoff function Ss=Ga(Ds) is calculated according to a coding rate S(q)=L/R(q) and an S/N ratio D(q) when a frame is coded with a quantization accuracy q. A method for calculating a picture quality tradeoff function is detailed in the appendix 2 of the reference cited in the Related Art.

A curve 602 is an objective function So=O (Do). The objective function So=O(Do) is a collection of pairs each of which includes a coding rate and an S/N ratio which achieve an optimally balanced assignment of coding distortion to time and space domains visually. This objective function So=O(Do) is determined beforehand based on simulation or the like.

A point 603a is an operation point which achieves an optimally balanced assignment of coding distortion to time and space domains visually if no transmission error occurs. This operation point 603a is an intersected point of the picture quality tradeoff function 601a and the objective function 602. When re-transmitting information about a frame according to the ARQ set forth in the Related Art, a next frame cannot be transmitted during re-transmission; accordingly, a transmission speed which is a ratio of a total transmission amount of the transmission path 4 to the time taken to transmit the total transmission amount is reduced. In this embodiment, this reduction of a transmission speed due to a transmission error can be absorbed by the next coding; furthermore, a picture quality tradeoff function Ss=Ga(Ds) is corrected to achieve an optimally balanced assignment of coding distortion to time and space domains visually.

A curve 601b is a picture quality tradeoff function Ss=Gb(Ds) which was corrected when a transmission speed was changed in this embodiment. A picture quality tradeoff function Ss=Gb(Ds) is calculated based on a coding rate S(q)=L/[R(q)+L·P·Tn−bn)] and an S/N ratio D(q). A coding rate is calculated by adding bits (L·P·Tn−bn) of the n-th frame which have not been transmitted to the next frame; thus, reduction of a transmission speed can be absorbed by a frame to be coded next. As a result, an operation point 603b which is an intersected point of the corrected picture quality tradeoff function 601b and the objective function 602 assigns coding distortion to time and space domains optimally in visual terms, and hence an optimally balanced assignment of reduction of a transmission speed to deterioration of movement reproductivity ΔS and deterioration of an S/N ratio ΔD is achieved.

FIG. 15 is a time chart showing the operation of a coding device in the third embodiment. FIG. 15(a) shows input frames. According to NTSC signal, about 30 frames are inputted per a second. FIG. 15(b) shows a frame to be coded and a coding time. FIG. 15(c) shows radio transmission. FIG. 15(d) shows display frames which are decoded from code data at the reception side. The coding device in this embodiment operates substantially the same as the conventional device after the fourth frame, and the description is not repeated.

With respect to a code amount R1(q) generated for a first frame, 2L<R1(q)≦3L is found, so that the succeeding second and third frames are dropped, and the fourth frame is coded after the first frame. Every frame is displayed on a display device at the reception side with a preset delay after its input time, and a transmission error occurs in transmission of code data relating to the first frame. FIGS. 15(a), 15(b), 15(c), and 15(d) graphically disclose the coding procedures and are collectively referred to as FIG. 15.

In FIG. 15, a time T1 passes since coding of the first frame starts until coding of the fourth frame starts, and b1 bits could be transmitted safely within the time T1. Therefore, the fourth frame is coded at a coding rate S4(q)=L/[R4(q)+L·P·T1−b1], and a picture quality tradeoff function is obtained in accordance with this coding rate and an S/N ratio which is D4(q). Then, an intersected point of the obtained function and the objective function is calculated.

Figure 16:
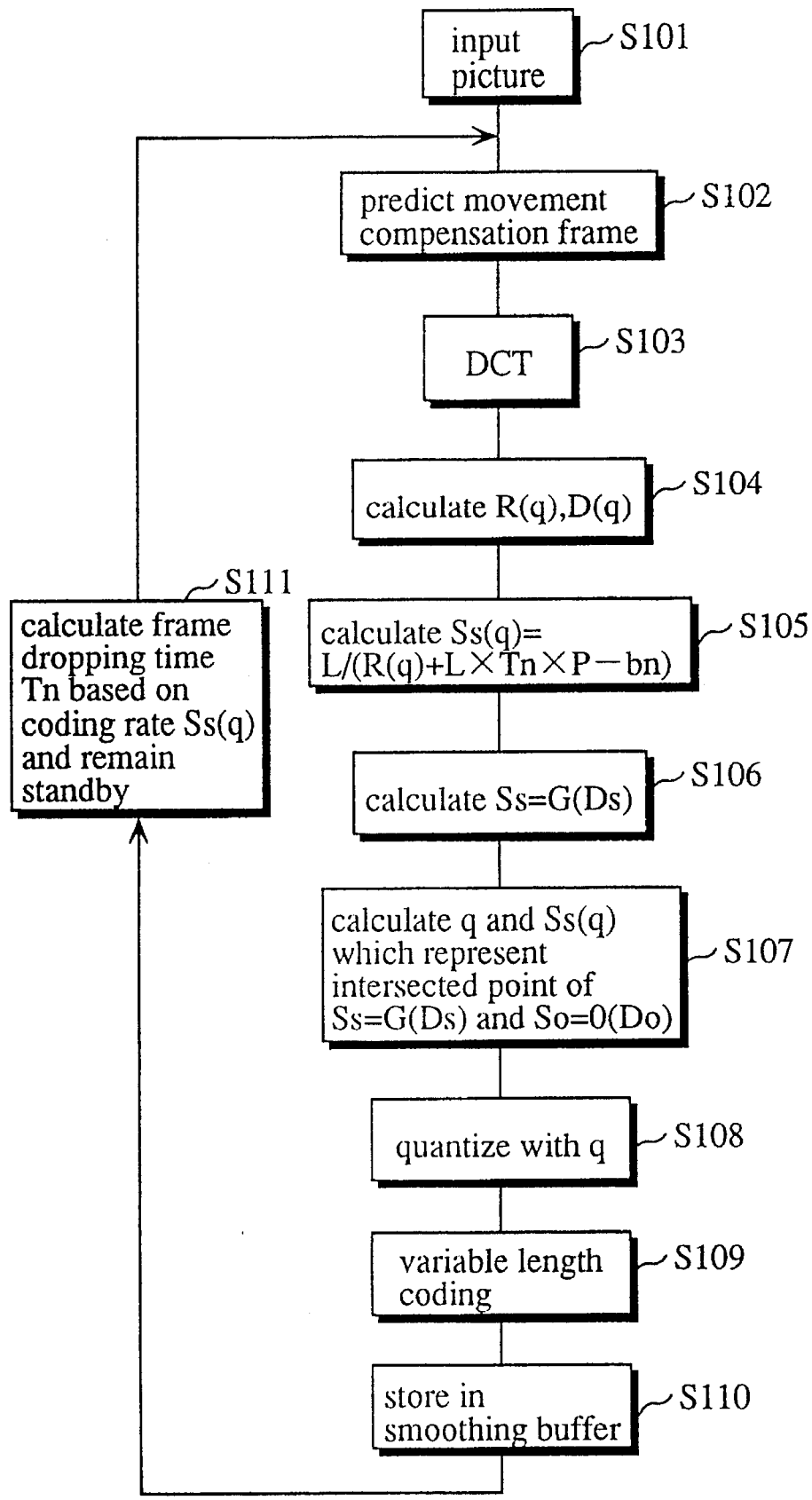
FIG. 16 is a flow chart describing the operation of a coding unit 27 in the third embodiment.

FIG. 16 is a flow chart describing the operation of the coding unit 27 in the third embodiment. Picture signals are inputted to the coding unit 27 at preset time intervals (Step S101), and the coding controller 250 controls the movement compensation frame predicting unit 221 and the DCT 222 (Step S102, Step S103).

The coding controller 250 calculates a code amount R(q) which will be generated when a frame is coded, and calculates an S/N ratio D(q) according to the DCT Coefficient histogram (Step S104).

The transmission controller 50 calculates bits bn of signal which were transmitted to the transmission path 4. The coding controller 250 calculates a corrected coding rate Ss (q)=L/{(R(q)+L·Tn·P−bn} based on the bit number bn calculated by the transmission controller 50 (Step S105).

The coding controller 250 calculates a picture quality tradeoff function Ss=G(Ds) from the S/N rate D(q) calculated at S104 and the coding rate Ss(q)=L/{(R(q)+L·P·Tn−bn} calculated at S105 (Step S106).

The coding controller 250 calculates a quantization accuracy q and a coding rate Ss(q) which represent an intersected point of the picture quality tradeoff function Ss and the objective function Ss=O(Do) (Step S107).

The quantization controller 250 activates the quantizing unit 223, and quantizes picture signal of one picture frame with the quantization accuracy q (Step S108).

The coding controller 250 activates the first variable length coding unit 224 and the second variable length coding unit 225 to code the quantized picture data (Step S109).

Code information which is the coded result from the first variable coding unit 224 and the second variable coding unit 225 is stored into the smoothing buffer 3, then it is transmitted to the transmission path 4 via the transmission controller 50 (Step S110).

The coding controller 250 calculates a frame dropping time Tn based on the coding rate Ss(q) obtained at Step S105, stays in standby only for the frame dropping time Tn (Step S111), then returns to Step S102.

Thus, a code amount (L·P·Tn−bn) for a last transmission frame which has not been transmitted is added to a code amount R(q) generated for a current transmission frame to calculate a coding rate Ss(q)=L/{R(q)+L·P·Tn−bn}, and hence a picture quality tradeoff function Ss=Ga(Ds) is corrected. Therefore, an operation point which is an intersected point of a corrected picture quality tradeoff function Ss=Gb(Ds) and an objective function So=O(Do) reflects a transmission speed which is reduced since the last coding starts until the next coding starts precisely. Coding deterioration due to a reduced transmission speed can be assigned to time and space domains to achieve an optimal deterioration balance of movement productivity ΔS and S/N ratio ΔD which represents spatial resolution visually.

Although the present invention is applied to the picture quality tradeoff function set forth in the reference cited in the Related Art, the present invention can also be applied to a method for assigning deterioration to time and space domains according to a coding rate.

Embodiment 4

A fourth embodiment of the present invention is described as referring to the drawings.

Figure 17:
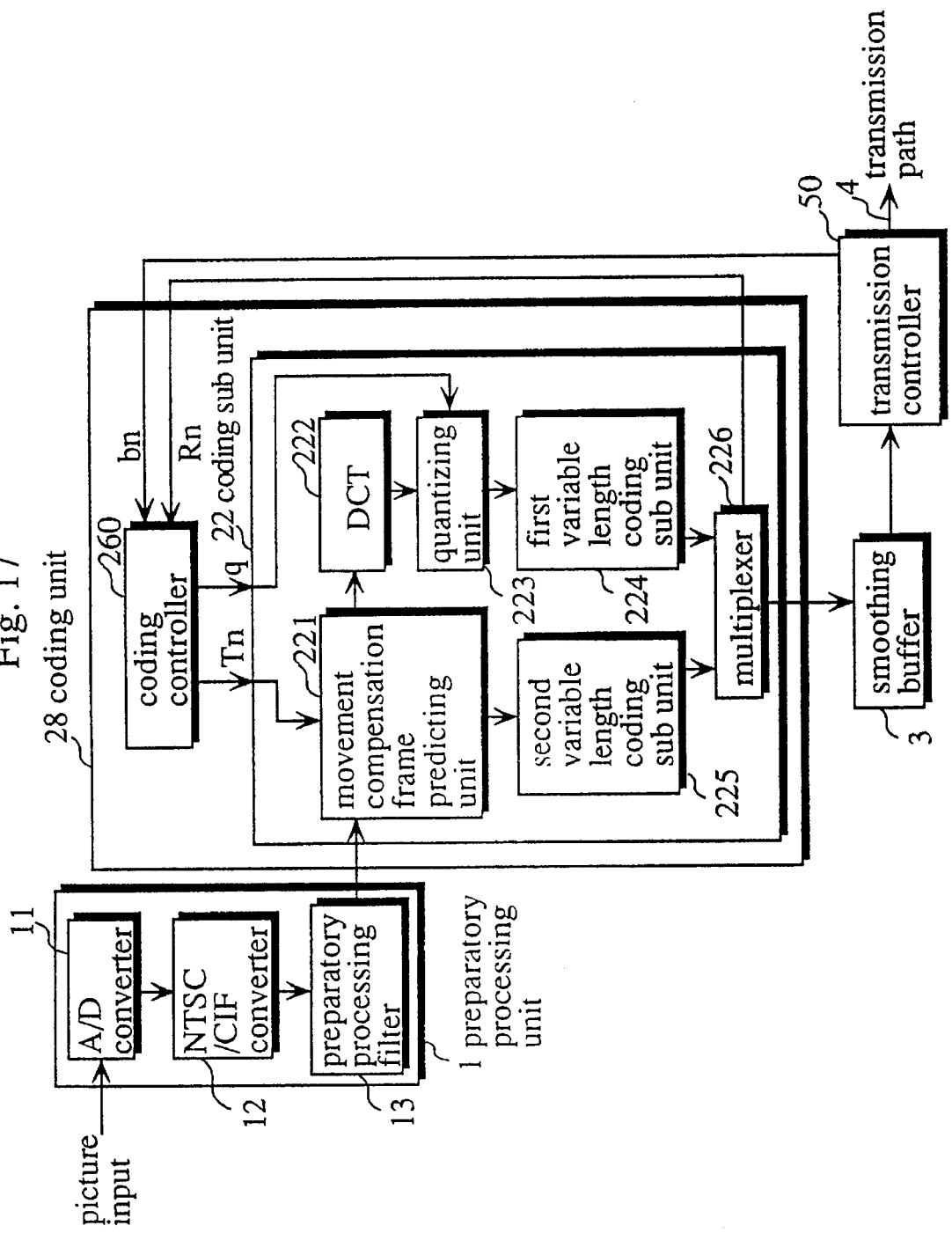
FIG. 17 is a block diagram depicting the entire configuration of a coding device in a fourth embodiment.
Figure 18:
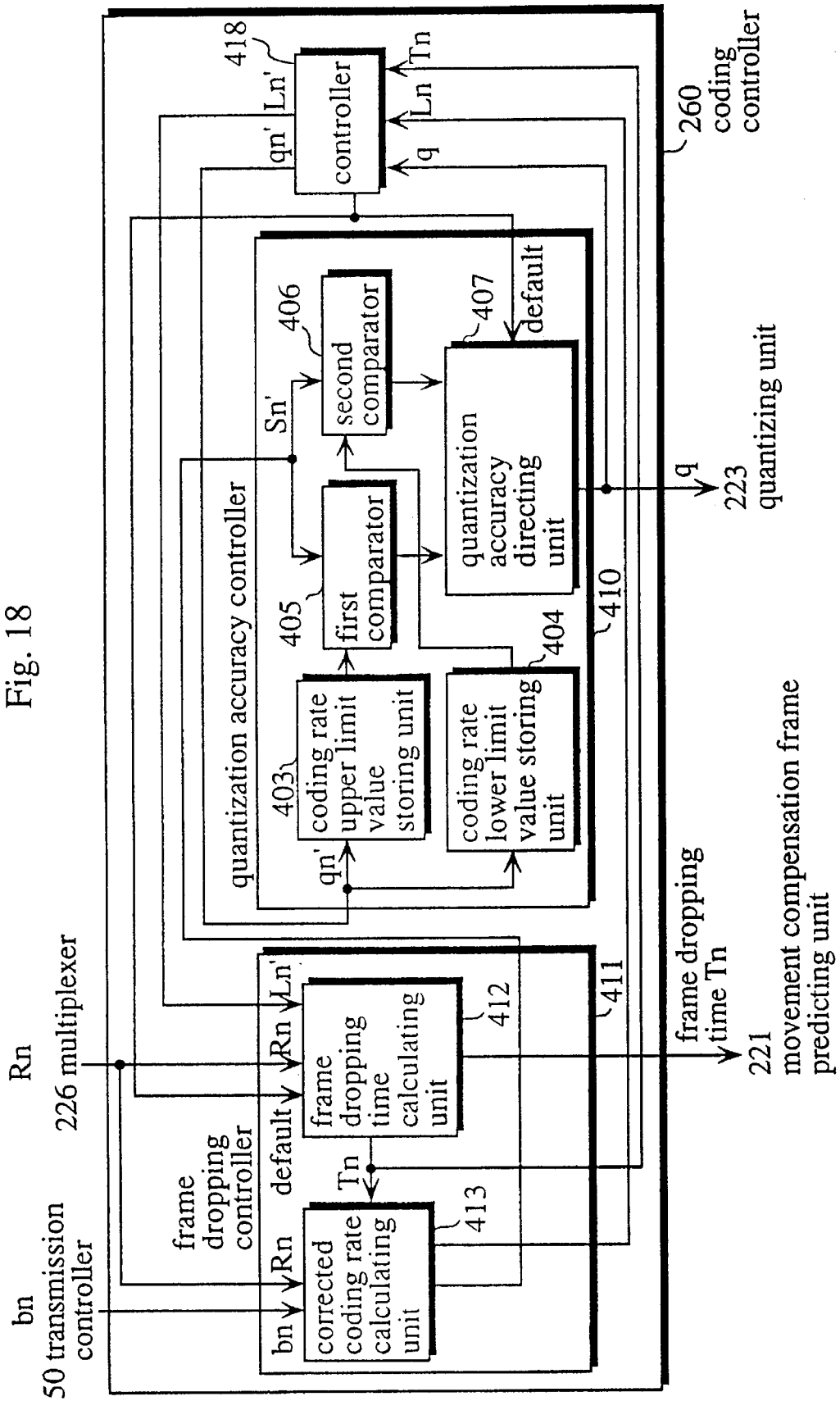
FIG. 18 is a block diagram depicting the configuration of a coding controller 260 in the fourth embodiment.

FIG. 17 is a block diagram depicting the entire configuration of a coding device in this embodiment. FIG. 18 is a block diagram depicting the configuration of a coding controller 260 in this embodiment. The coding device in this embodiment is substantially the same as that in the third embodiment except the coding controller 260, so that like components are labeled like numerals with respect to the third embodiment, and the description is not repeated. The coding controller 260 comprises the quantization accuracy controller 410, the frame dropping controller 411, and the controller 418. The quantization accuracy controller 410 is the same as that in the first embodiment, and the description is not repeated. The frame dropping controller 411 further comprises a frame dropping time calculating unit 412 and a corrected coding rate calculating unit 413.

The frame dropping time calculating unit 412 detects a code amount Rn generated for the n-th frame which was coded the last time from the multiplexer 226, and stores the code amount Rn. The frame dropping time calculating unit 412 calculates a coding rate Sn and a frame dropping time Tn based on a transmission speed L per one frame period of the transmission path 4 and the code amount Rn. In responding to the controller 418, the frame dropping time calculating unit 412 calculates a frame dropping time Tn' based on the transmission speed Ln calculated by the corrected coding rate calculating unit 413.

The corrected coding rate calculating unit 413 calculates a transmission speed Ln=bn/Tn·P per one frame period within the frame dropping time Tn based on the frame dropping time Tn calculated by the frame dropping time calculating unit 412 and the transmitted code amount bn received from the transmission controller 50. The corrected coding rate calculating unit 413 calculates a corrected coding rate Sn'=Ln/Rn=bn/Rn·Tn·P.

The controller 480 compares a transmission speed Ln calculated by the corrected coding rate calculating unit 413 with a transmission speed L of the transmission path 4, and outputs a corrected transmission speed Ln to the frame dropping time calculating unit 412 if L>Ln so that the frame dropping time calculating unit 412 calculates a frame dropping time tn'. The controller 418 controls the multiplexer 226 to stay in standby for the frame dropping time tn' until the next coding. Frames inputted during the frame dropping time tn' are dropped.

Figure 19:
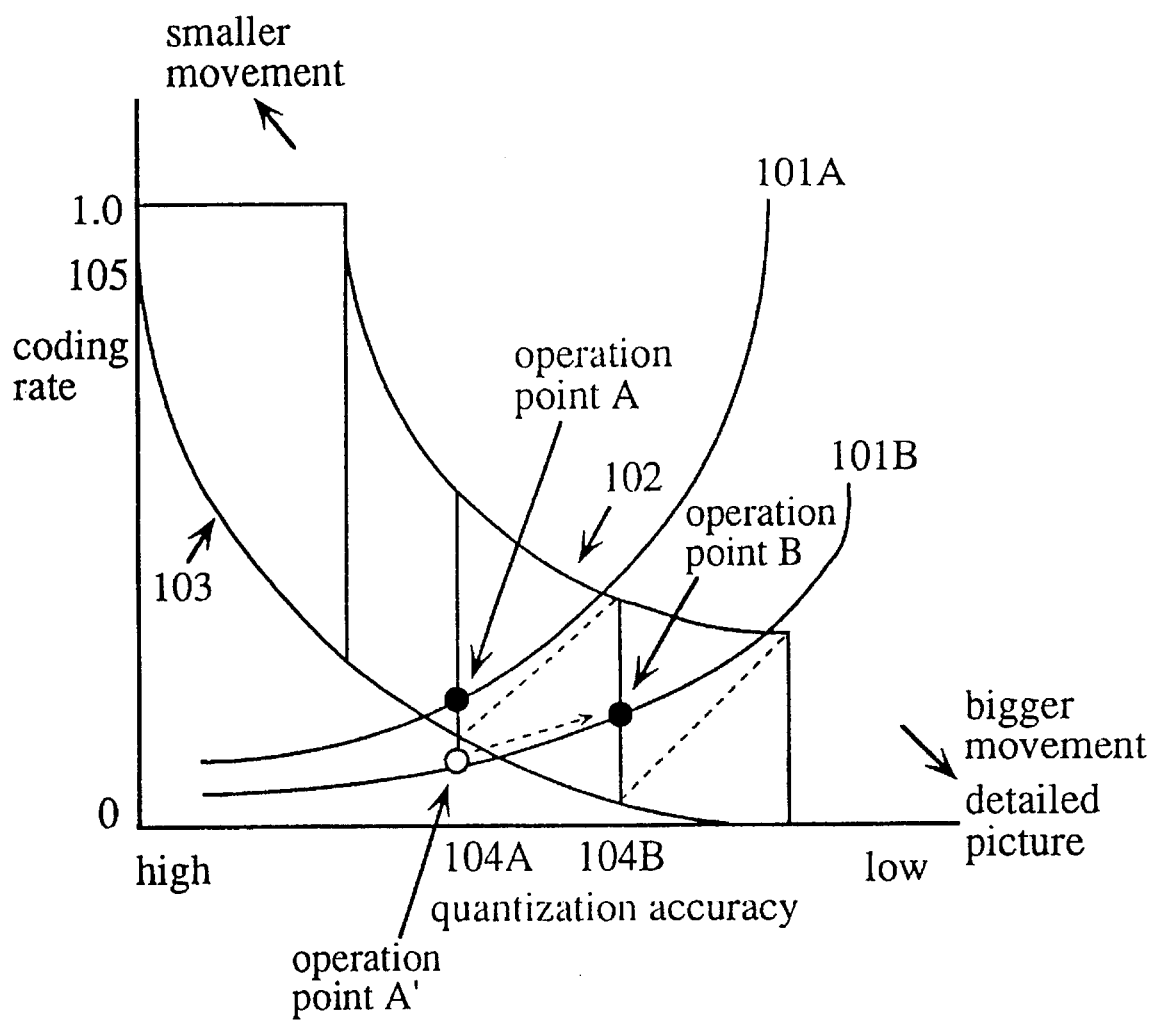
FIG. 19 is a graph explaining a principle of a coding control method in the fourth embodiment.

FIG. 19 explains a principle of a coding control method in this embodiment. The correction method for absorbing reduction in a transmission speed due to a transmission error by the next coding in the third embodiment is applied to the coding-control method in the first embodiment.

It is assumed that a transmission speed is reduced because of a transmission error in the time period which starts when coding of the last frame starts and continues until the next coding starts. In FIG. 19, an operation point A which is the coded result of the last frame is replaced with an operation point A' which is obtained by changing a coding rate from S=L/R1 to S'=(b1/T1·P)/R1=b1/(R1·T1·P). Since this operation point A' is smaller than a lower limit value on an optimal coding rate, a quantization accuracy for the next coding is lowered by one level. That is, a coding rate Sn for the n-th frame is obtained by dividing an average transmission speed (bn/Tn·P) per one frame period which begins when coding of the n-th frame starts and continues until the next coding starts by a code amount Rn generated for the n-th frame.

FIG. 20 is a time chart showing the operation of a coding device in the fourth embodiment. FIGS. 20(a), 20(b), 20(c), and 20(d) are the same as FIGS. 15(a), 15(b), 15(c), and 15(d) respectively.

As shown in FIG. 20, a time T1 passes since coding of the first frame starts until coding of the fourth frame starts, and b1 bits can be transmitted in the time T1. Accordingly, an actual transmission speed L1 of the transmission path 4 is L1=b1/T1·P when a transmission error occurs in transmission of the first frame. Accordingly, to code the fourth frame, the coding controller 260 corrects the operation point A for the first frame into an operation point A' by updating the coding rate to an actual coding rate S1=b1/(R1·T1·P) and holding the same quantization accuracy q. Then, by comparing this operation point A' with upper limit and lower limit on an optimal coding rate, a quantization accuracy for the next coding is determined.

Figure 21:
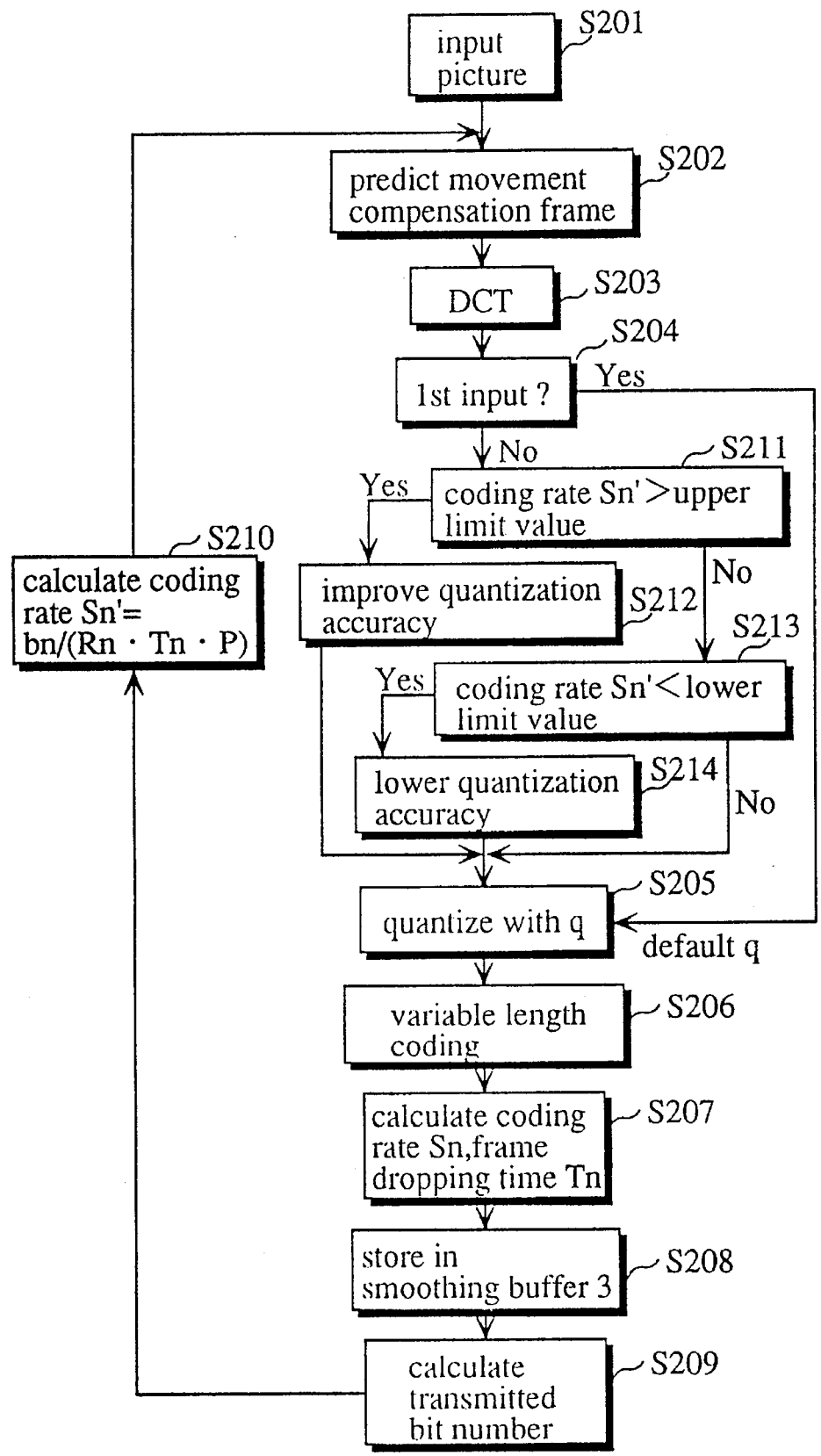
FIG. 21 is a flow chart describing the operation of a coding unit 28 in the fourth embodiment.

FIG. 21 is a flow chart showing the operation of the coding unit 28 in the fourth embodiment.

First Frame

When picture signal for the first frame is inputted to the coding unit 28 (Step S201), the coding controller 210 activates the movement compensation frame predicting unit 221 and the DCT 222 (Step S202, Step S203).

If the inputted picture signal represents the first frame (Step S204), the coding controller 260 quantizes it with a preset initial quantization value q0 since no reference frame exists (Step S205). The coding controller 260 stores the quantization accuracy q0 into an internal memory which is not illustrated.

The coding controller 260 activates the first variable length coding unit 224 and the second variable length coding unit 225 to code the quantized picture data (Step S206).

The coding controller 260 calculates a coding rate S1 for the first frame, and stores it into the internal memory, also calculates a frame dropping time T1 until the next coding based on the coding rate S1 (Step S207).

The picture signal which is coded by the first variable length coding unit 224 and the second variable length coding unit 225 is stored into the smoothing buffer 3 (Step S208), then it is transmitted to the transmission path 4 via the transmission controller 50 (Step S209). At Step 209, the transmission controller 50 detects bits b1 which have been transmitted to the transmission path 4.

According to the bit number b1 at Step S209, the coding controller 260 calculates an actual coding rate S1 for the first frame according to an expression Sn'=bn/(Rn·Tn·P) again (Step S210). The thus calculated actual coding rate S1' is stored in the internal memory of the coding controller 260.

Subsequently, the coding controller 260 returns to Step S202 again.

After the m-th Frame (m≧2, m is a Natural Number)

When picture signal for the m-th frame being the second frame or after is inputted to the coding unit 28 (Step S201), the coding controller 260 activates the movement compensation frame predicting unit 221 and the DDT 222 (Step S202 and S203), then judges that the inputted picture signal is the second frame or after (Step S204).

The coding controller 260 decides a quantization accuracy for the next coding based on the principle shown in FIG. 19. More specifically, the coding controller 260 obtains a corrected operation point A' by replacing a coding rate Sm of an operation point A at the last coding with an actual coding rate Sm' calculated at Step S211, and compares this corrected operation point A' with upper limit and lower limit on an optimal coding rate. If the coding rate Sm' of the operation point A' exceeds upper limit on an optimal coding rate, a quantization accuracy is increased by one level. If the coding rate Sm' is smaller than lower limit on an optimal coding rate, a quantization accuracy is decreased by one level. If the coding rate Sm' does not exceed upper limit, nor is smaller than lower limit, a quantization accuracy remains the same (Steps S211–S214).

The coding controller 260 activates the quantizing unit 223 to quantize picture signal for the respective frame with a quantization accuracy q set at Step S212 (S205). Being the same as the first frame coding, Steps S206–Step S211 are operated.

Thus, according to this embodiment, a coding rate for a frame which was coded the last time is corrected according to a code amount which has not been transmitted due to a reduced transmission speed. If a corrected coding rate exceeds upper limit on an optimal coding rate, a quantization accuracy is increased. If the corrected rate is smaller than lower limit on an optimal coding rate, a quantization accuracy is decreased. Therefore, movement reproductivity, spatial resolution, and noise can be balanced optimally with simple control. Also, deterioration which is caused by a reduced transmission speed can be assigned to time and space domains optimally in visual terms.

Although the preset invention is applied to a method for accomplishing optimal assignment of coding distortion to time and space domains set forth in the first embodiment, it can be applied to another method for assigning coding distortion to time and space domains based on a coding rate.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A coding device for coding moving pictures to be transmitted by a transmission path of a preset transmission speed by setting a pair of a quantization accuracy and a coding rate appropriately, the quantization accuracy by which coding distortion to space domain is measured and the coding rate being a function of the quantization accuracy by which coding distortion to time domain due to frame dropping is measured so that an optimal balance of the coding distortion in a display picture to the time and space domains in visual terms is achieved, said coding device comprising;

a coding means for coding a moving picture signal according to input order;

a quantization accuracy holding means for holding a quantization accuracy with which a latest frame is coded;

a coding rate calculating means for calculating a coding rate for the latest frame which was coded;

an optimal coding rate upper limit storing means for storing a preset upper limit value on an optimal coding rate which corresponds to a preset quantization accuracy;

an optimal coding rate lower limit storing means for storing a preset lower limit value on an optimal coding rate which corresponds to a preset quantization accuracy;

a first comparing means for comparing a coding rate for the latest frame calculated by the coding rate calculating means with the upper limit value on an optimal coding rate which corresponds to the quantization accuracy held by the quantization accuracy holding means;

a second comparing means for comparing a coding rate for the latest frame calculated by the coding rate calculating means with the lower limit value on an optimal coding rate which corresponds to the quantization accuracy held by the quantization accuracy holding means;

a quantization accuracy storing means for storing a plurality of quantization accuracies which are set beforehand;

a quantization accuracy selecting means for selecting a quantization accuracy which is more accurate than the quantization accuracy with which the latest frame is coded when the coding rate for the latest frame is greater than the upper limit value on an optimal coding rate, for selecting a quantization accuracy which is less accurate than the quantization accuracy with which the latest frame is coded when the coding rate for the latest frame is smaller than the lower limit value on an optimal coding rate from the plurality of quantization accuracies stored in the quantization accuracy storing means, and for selecting the quantization accuracy with which the latest frame is coded when the coding rate for the latest frame is in a range between the lower limit value and the upper limit value, the range including both the lower limit value and the upper limit value; and a coding control means for controlling the coding means to operate the next coding with the quantization accuracy selected by the quantization accuracy selecting means.

2. The coding device of claim 1 further comprises a code amount detecting means for detecting a code amount which is generated when the latest frame is coded, wherein the coding rate calculating means calculates a coding rate based on an expression which is (coding rate)=(standard transmission speed of transmission path)/(code amount).

3. The coding device of claim 2 further comprises a transmitting means for transmitting the coded frame to reception side by the transmission path, and re-transmits transmission information which generates a transmission error in responding to a request from the reception side according to an ARQ (Automatic-Repeat-Request);

a frame dropping time calculating means for calculating a frame dropping time which starts when the coding means starts coding and ends when the coding means starts another coding;

an actual transmission code amount detecting means for detecting an actual transmission code amount which could be transmitted without an error within the frame dropping time calculated by the frame dropping time calculating means; and an actual transmission speed calculating means for calculating an actual transmission speed based on the frame dropping time calculated by the frame dropping time calculating means and the actual transmission code amount calculated by the actual transmission code amount calculating means, wherein the coding rate calculating means calculates a coding rate based on the actual transmission speed calculated by the actual transmission speed calculating means and the code amount which is generated when the latest frame is coded.

4. The coding device of claim 3 further comprises a buffer for storing the coded frames in order and outputting them according to a First-In-First-Out manner;

a code amount predicting means for predicting a code amount which will be generated when the coding means codes one frame;

a remaining storage capacity detecting means for detecting a remaining storage capacity of the buffer; and a coding instructing means for instructing standby of the coding means if the code amount predicted by the code amount predicting means is larger than the remaining storage capacity of the buffer detected by the remaining storage capacity detecting means; otherwise, instructing coding of the coding means.

5. The coding device of claim 4, wherein the code amount predicting means comprises a frame difference calculating unit for calculating a frame difference between a frame to be coded and a reference frame which is determined according to the frame to be coded, the frame difference representing a simple difference in picture information of a block located at the same location;

a DCT (Discrete Cosine Transform) means for DCT converting the frame difference according to DCT;

an invalid block calculating means for setting a first level of quantization as a threshold value, and summing an invalid block where every DCT coefficient obtained by the DCT means is smaller than the threshold value;

a valid block calculating means for calculating a total number of a valid block by subtracting the invalid block from all the blocks included in a frame to be coded;

a proportional constant calculating unit for calculating a proportional constant between the code amount detected by the code amount detecting means and the valid block number relating to the latest frame calculated by the valid block calculating means; and a predicted code amount calculating unit for calculating a predicted code amount by multiplying the valid block number relating to the frame to be coded by the proportional constant calculated by the proportional constant calculating unit.

6. The coding device of claim 2 further comprises a buffer for storing the coded frames in order and outputting them according to a First-In-First-Out manner;

a code amount predicting means for predicting a code amount which will be generated when the coding means codes one frame;

a remaining storage capacity detecting means for detecting a remaining storage capacity of the buffer; and a coding instructing means for instructing standby of the coding means if the code amount predicted by the code amount predicting means is larger than the remaining storage capacity of the buffer detected by the remaining storage capacity detecting means; otherwise, instructing coding of the coding means.

7. The coding device of claim 6, wherein the code amount predicting means comprises a frame difference calculating unit for calculating a frame difference between a frame to be coded and a reference frame which is determined according to the frame to be coded, the frame difference representing a simple difference in picture information of a block located at the same location;

a DCT (Discrete Cosine Transform) means for DCT converting the frame difference according to DCT;

an invalid block calculating means for setting a first level of quantization as a threshold value, and summing an invalid block where every DCT coefficient obtained by the DCT means is smaller than the threshold value;

a valid block calculating means for calculating a total number of a valid block by subtracting the invalid block from all the blocks included in a frame to be coded;

a proportional constant calculating unit for calculating a proportional constant between the code amount detected by the code amount detecting means and the valid block number relating to the latest frame calculated by the valid block calculating means; and a predicted code amount calculating unit for calculating a predicted code amount by multiplying the valid block number relating to the frame to be coded by the proportional constant calculated by the proportional constant calculating unit.

8. A coding method for coding moving pictures to be transmitted by a transmission path of a preset transmission speed by setting a pair of a quantization accuracy and a coding rate appropriately, the quantization accuracy by which coding distortion to space domain is measured and the coding rate being a function of the quantization accuracy by which coding distortion to time domain due to frame dropping is measured so that an optimal balance of the coding distortion in a display picture to the time and space domains to human eyes is achieved, said coding method comprising:

a first step of coding with a first quantization accuracy;

a second step of comparing a first coding rate which is obtained by coding at the first step with an upper limit value and a lower limit value on an optimal coding rate which are determined according to the first quantization accuracy and the first coding rate beforehand; and a third step of setting as a quantization accuracy for next coding a second quantization accuracy which is more accurate than the first quantization accuracy if the first coding rate is greater than the upper limit value, a third quantization accuracy which is less accurate than the first quantization accuracy if the first coding rate is smaller than the upper limit value, and the first quantization accuracy if the first coding rate is in a range between the lower limit value and the upper limit value, the range including both the lower limit value and the upper limit value.

9. The coding method of claim 8, wherein the second step comprises:

a code amount detecting step of detecting a code amount which is generated when a frame is coded with the first quantization accuracy; and a coding rate calculating step of calculating a coding rate by dividing a standard transmission speed of the transmission path by the detected code amount.

10. The coding method of claim 8, wherein the second step comprises:

a code amount detecting step of detecting a code amount which is generated when a frame is coded with the first quantization accuracy;

an average transmission speed calculating step of calculating an average transmission speed during a period which begins when coding with the first quantization accuracy starts and continues until a preset standby time is over; and a coding rate calculating step of calculating a coding rate by dividing the calculated average transmission speed by the detected code amount.

11. The coding method of claim 8, wherein the second step comprises:

a code amount detecting step of detecting a code amount which is generated when a frame is coded with the first quantization accuracy;

an actual transmission code amount detecting step of detecting an actual transmission code amount which could be transmitted without an error during a period which begins when coding with the first quantization accuracy starts and continues until a preset standby time is over;

a standard transmission code amount calculating step of calculating a standard transmission code amount which should have been transmitted within the standby period by multiplying the standard speed of the transmission path by the standby time;

an untransmitted code amount calculating step of calculating an untransmitted code amount which could have been transmitted within the standby period if a transmission speed had not been decreased by subtracting the actual code amount which could be transmitted safely within the standby period from the code amount which were planned to be transmitted within the standby time;

a corrected code amount calculating step of calculating a corrected code amount by adding the untransmitted code amount to the detected code amount; and a coding rate calculating step of calculating a coding rate by dividing the standard speed of the transmission path by the corrected code amount.

12. A coding device for coding moving pictures to be transmitted in a transmission path of a preset transmission speed by setting a quantization accuracy by which coding distortion to space domain is measured and a coding rate as a function of the quantization accuracy by which coding distortion to time domain due to frame dropping is measured so that an optimal balance of the coding distortion in a display picture to time and space domains in visual terms is achieved, said coding device comprising:

a coding means for coding a moving picture signal according to input order;

a quantization accuracy holding means for holding a quantization accuracy value with which a latest frame is coded;

a quantization accuracy storing means for storing a plurality of predetermined quantization accuracy values;

a coding rate calculating means for calculating a coding rate for a frame which was coded;

a coding rate storing means for storing an upper and lower limit value to the coding rate;

comparing means for comparing a coding rate for the latest frame calculated by the coding rate calculating means with the upper limit value of the coding rate and with the lower limit value of the coding rate;

a quantization accuracy selecting means for selecting, from the quantization accuracy storing means, a quantization accuracy value which is more accurate than the quantization accuracy value with which the latest frame is coded when the coding rate for the latest frame is greater than the upper limit value of the coding rate, for selecting a quantization accuracy value which is less accurate than the quantization accuracy value with which the latest frame is coded when the coding rate for the latest frame is smaller than the lower limit value of the coding rate, and for selecting the quantization accuracy value with which the latest frame is coded when the coding rate for the latest frame is in a range between the lower limit value and the upper limit value, the range including both the lower limit value and the upper limit value; and a coding control means for controlling the coding means to operate upon the next coding with the quantization accuracy value selected by the quantization accuracy selecting means.

13. The coding device of claim 12 further comprises a code amount detecting means for detecting a code amount which is generated when the latest frame is coded, wherein the coding rate calculating means calculates a coding rate based on an expression which is (coding rate)=(standard transmission speed of transmission path)/(code amount).

14. The coding device of claim 13 further comprises a transmitting means for transmitting the coded frame to a reception side by the transmission path, and re-transmits transmission information which generates a transmission error in responding to a request from the reception side according to an ARQ (Automatic-Repeat-Request);

a frame dropping time calculating means for calculating a frame dropping time which starts when the coding means starts coding and ends when the coding means starts a subsequent coding;

an actual transmission code amount detecting means for detecting an actual transmission code amount which could be transmitted without an error within the frame dropping time calculated by the frame dropping time calculating means; and an actual transmission speed calculating means for calculating an actual transmission speed based on the frame dropping time calculated by the frame dropping time calculating means and the actual transmission code amount calculated by the actual transmission code amount calculating means, wherein the coding rate calculating means calculates a coding rate based on the actual transmission speed calculated by the actual transmission speed calculating means and the code amount which is generated when the latest frame is coded.

15. A coding device for coding to compress a moving picture signal for a frame, and outputting the coded frame to a transmission path via a buffer, the coding device comprising:

a coding means for coding the inputted moving picture signal for a frame;

a code amount predicting means for predicting a code amount which will be generated when the coding means codes one frame, including a frame difference calculating unit for calculating a frame difference between a frame to be coded and a reference frame which is determined according to the frame to be coded, the frame difference representing a simple difference in picture information of a block located at the same location;

a DCT (Discrete Cosine Transform) means for DCT converting the frame difference according to DCT;

an invalid block calculating means for setting a first level of quantization as a threshold value, and summing an invalid block where every DCT coefficient obtained by the DCT means is smaller than the threshold value;

a valid block calculating means for calculating a total number of a valid block by subtracting the invalid block from all the blocks includes in a frame to be coded;

a proportional constant calculating unit for calculating a proportional constant between the code amount detected by the code amount predicting means and the valid block number relating to the latest frame calculated by the valid block calculating means;

a predicted code amount calculating unit for calculating a predicted code amount by multiplying the valid block number relating to the frame to be coded by the proportional constant calculated by the proportional constant calculating unit;

a remaining storage capacity detecting means for detecting a remaining storage capacity of the buffer; and a coding instructing means for instructing standby of the coding means if the code amount predicted by the code amount predicting means is larger than the remaining storage capacity of the buffer detected by the remaining storage capacity detecting means, otherwise, instructing coding of the coding means.

16. A coding method for coding to compress a moving picture signal for a frame, and outputting the coded frame to a transmission path via a buffer, the coding method comprising:

a coding step of coding the inputted moving picture signal for a frame, including a code amount detecting step of detecting a code amount which is generated when a frame is coded;

a proportional constant calculating step of calculating a proportional constant by dividing the detected code amount by a valid block number of the coded frame, and the code amount predicting step comprises:

a frame difference value calculating step of calculating a simple difference between the inputted frame and a reference frame which is employed in prediction coding;

a DCT (Discrete Cosine Transform) step of DCT converting the calculated difference;

an invalid block calculating step of comparing a DCT coefficient obtained by the DCT with a threshold value which is a first level of quantization, and summing an invalid block where every DCT coefficient is smaller than the threshold value;

a valid block calculating step of summing the valid block by subtracting the invalid block from all the blocks for the inputted frame;

a code amount predicting step of predicting a code amount by multiplying the valid block number by the proportional constant;

a buffer outputting step of outputting the coded frame to a buffer;

a transmission path outputting step of outputting code information within the buffer to the transmission path;

an inputting step of inputting a next frame;

a code amount predicting step of predicting a code amount which will be generated when the inputted frame is coded;

a remaining storage capacity detecting step of detecting a remaining storage capacity of the buffer;

a comparing step of comparing the detected remaining storage capacity of the buffer with the predicted code amount; and a coding control step of instructing coding when the remaining storage capacity of the buffer is the predicted code amount or greater, otherwise instructing staying in standby until the next frame is inputted.

* * * * *